US009997016B2

(12) United States Patent
Arnone et al.

(10) Patent No.: US 9,997,016 B2
(45) Date of Patent: Jun. 12, 2018

(54) PARALLEL AI HYBRID GAMING SYSTEM

(71) Applicant: Gamblit Gaming, LLC, Glendale, CA (US)

(72) Inventors: Miles Arnone, Sherborn, MA (US); Frank Cire, Pasadena, CA (US); Scott Shimmin, Vista, CA (US); Eric Meyerhofer, Pasadena, CA (US); David Chang, San Gabriel, CA (US); Clifford Kaylin, Los Angeles, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 466 days.

(21) Appl. No.: 14/839,647

(22) Filed: Aug. 28, 2015

(65) Prior Publication Data

US 2016/0055711 A1 Feb. 25, 2016

Related U.S. Application Data

(63) Continuation of application No. PCT/US2014/019698, filed on Feb. 28, 2014.

(60) Provisional application No. 61/784,911, filed on Mar. 14, 2013, provisional application No. 61/771,014, filed on Feb. 28, 2013.

(51) Int. Cl.
*A63F 13/00* (2014.01)
*G07F 17/32* (2006.01)

(52) U.S. Cl.
CPC .......... *G07F 17/3225* (2013.01); *G07F 17/32* (2013.01); *G07F 17/3262* (2013.01); *G07F 17/3295* (2013.01)

(58) Field of Classification Search
None
See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |

(Continued)

FOREIGN PATENT DOCUMENTS

WO 2013010036 A1 1/2013

OTHER PUBLICATIONS

U.S. Appl. No. 14/185,847 Arnone, et al., filed Feb. 20, 2014.

(Continued)

*Primary Examiner* — Omkar Deodhar
*Assistant Examiner* — Eric M Thomas
(74) *Attorney, Agent, or Firm* — Caitlyn Ross

(57) ABSTRACT

A parallel AI hybrid game that allows a player to play a hybrid game against an Artificially Intelligent Non-Player Character (AI NPC). In operation, the player and the AI NPC utilize different respective pseudo random or random number generators to generate respective wagering outcomes.

15 Claims, 25 Drawing Sheets

(56) References Cited

U.S. PATENT DOCUMENTS

| | | | |
|---|---|---|---|
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,475,266 | B2 | 7/2013 | Arnone |
| 8,480,470 | B2 | 7/2013 | Napolitano et al. |
| 8,622,809 | B1 | 1/2014 | Arora et al. |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0037149 | A1 | 2/2003 | Hess |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2006/0281509 | A1 | 12/2006 | Arias-Vargas |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |

(56) References Cited

U.S. PATENT DOCUMENTS

| | | | |
|---|---|---|---|
| 2009/0275393 | A1 | 11/2009 | Kisenwether |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1 | 12/2012 | Arnone et al. |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Leandro et al. |
| 2014/0087801 | A1 | 3/2014 | Nicely et al. |
| 2014/0087808 | A1 | 3/2014 | Leandro et al. |
| 2014/0087809 | A1 | 3/2014 | Leupp et al. |
| 2014/0357350 | A1 | 12/2014 | Weingardt et al. |

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.

(56) References Cited

OTHER PUBLICATIONS

U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/825,056 Arnone, et al. filed Aug. 12, 2015.
WIPO/IPEA International Preliminary Report on Patentability, PCT/US14/19698, dated Jun. 25, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.

PARALLEL AI HYBRID GAMING SYSTEM

CROSS-REFERENCE TO RELATED APPLICATIONS

The current application is a continuation of Patent Cooperation Treaty Application No. PCT/US14/19698, filed Feb. 28, 2014, which claims the benefit of US Provisional Application Nos. 61/771,014, filed Feb. 28, 2013, and 61/784,911, filed Mar. 14, 2013, the disclosure of each of which is incorporated herein by reference as if set forth herewith. This application references Patent Cooperation Treaty Application Nos. PCT/US12/58156, filed Sep. 29, 2012, PCT/US11/26768, filed Mar. 1, 2011, PCT/US11/63587, filed Dec. 6, 2011, and PCT/US12/50204 filed Aug. 9, 2012, each disclosure of which is hereby incorporated by reference herein in its entirety.

FIELD OF THE INVENTION

Embodiments of the present invention are generally related to gambling games and more specifically to systems and processes that provide a gambling game having an Artificially Intelligent (AI) opponent.

BACKGROUND OF THE INVENTION

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game.

SUMMARY OF THE INVENTION

The disclosed embodiments relate generally to an interactive entertainment game where skill and chance may coalesce to provide a rich arcade-style gaming experience, visually exciting and challenging, where players may wager cash, credits prizes and points in order to win more of the foregoing. Many of the embodiments of the design provide an enticing method of gaming to the players who expect a high level of entertainment content in their gaming experience compared to the relatively simple game methods in use today.

Systems in accordance with embodiments of this invention provide for a parallel AI hybrid gaming system, including a processing device constructed to execute an entertainment game of skill for a player, where the player is a human player, communicate, to a game world server, a signal including a trigger of a wager of game world credits triggered by a player's action during the player's skillful play of the entertainment game, communicate, to the game world server, a signal including a trigger of a wager of virtual credits triggered by an Artificially Intelligent Non-Player Character's (AI NPC) action taken by an AI NPC opponent of the player during the player's skillful play of the entertainment game, where the AI NPC is not the human player, receive, from the game world server, a signal including a result of a wager of game world credits triggered by the player's action during the player's skillful play of the entertainment game, receive, from the game world server, a signal including a result of a wager of virtual credits triggered by the AI NPC's action taken by the AI NPC opponent of the player during the player's skillful play of the entertainment game, display the result of the wager of game world credits triggered by the player's action during the player's skillful play of the entertainment game, and display the result of the wager of virtual credits triggered by the AI NPC's action taken by the AI NPC opponent of the player during the player's skillful play of the entertainment game.

In accordance with numerous embodiments, a gambling hybrid gaming system further includes a player real world server constructed to receive, from the game world server, a signal including a request for a resolution of the wager of game world credits triggered by the player's action during the player's skillful play of the entertainment game, determine the result of the wager of game world credits triggered by the player's action during the player's skillful play of the entertainment game, and communicate, to the game world server, the signal including the result of the wager of game world credits triggered by the player's action during the player's skillful play of the entertainment game.

In accordance with many embodiments, a gambling hybrid gaming system further includes an AI real world server constructed to receive, from the game world server, a signal including a request for a resolution of a wager of virtual credits triggered by the AI NPC's action taken by the AI NPC opponent of the player during the player's skillful play of the entertainment game, determine the result of the wager of virtual credits triggered by the AI NPC's action taken by the AI NPC opponent of the player during the player's skillful play of the entertainment game, and communicate, to the game world server, the signal including the result of the wager of virtual credits triggered by the AI NPC's action taken by the AI NPC opponent of the player during the player's skillful play of the entertainment game.

In accordance with various embodiments, a gambling hybrid gaming system further includes the game world server, connected to the processing device and the AI real world server via a network and connected to the real world server via a communication link, constructed to continuously monitor the processing device for the signal including the trigger of the wager of game world credits triggered by the player's action during the player's skillful play of the entertainment game, continuously monitor the processing device for the signal including the trigger of the wager of virtual credits triggered by the AI NPC's action taken by the AI NPC opponent of the player during the player's skillful play of the entertainment game, receive, from the processing device, the signal including the trigger of the wager of game world credits triggered by the player's action during the player's skillful play of the entertainment game, receive, from the processing device, the signal including the trigger of the wager of virtual credits triggered by the AI NPC's action taken by the AI NPC opponent of the player during the player's skillful play of the entertainment game, and distinguish between the signal including the trigger of the wager of game world credits triggered by the player's action during the player's skillful play of the entertainment game and the signal including the trigger of the wager of virtual credits triggered by the AI NPC's action taken by the AI NPC opponent of the player during the player's skillful play of the entertainment game.

In accordance with numerous embodiments, a gambling hybrid gaming system further includes the game world server, connected to the processing device and the AI real world server via a network and connected to the real world server via a communication link, constructed to determine whether to trigger the wager based on the signal including the trigger of the wager of game world credits triggered by the player's action during the player's skillful play of the entertainment game, determine whether to trigger the wager based on the signal including the wager of virtual credits triggered by the AI NPC's action taken by the AI NPC opponent of the player during the player's skillful play of the entertainment game, communicate, to the real world server, the signal including the request for the resolution of the wager of game world credits triggered by the player's action during the player's skillful play of the entertainment game, communicate, to the AI real world server, the signal including the request for the resolution of the wager of virtual credits triggered by the AI NPC's action taken by the AI NPC opponent of the player during the player's skillful play of the entertainment game, receive, from the real world server, the signal including the result of the wager of game world credits triggered by the player's action during the player's skillful play of the entertainment game, receive, from the AI real world server, the signal including the result of the wager of virtual credits triggered by the AI NPC's action taken by the AI NPC opponent of the player during the player's skillful play of the entertainment game, communicate, to the processing device, the signal including the result of the wager of game world credits triggered by the player's action during the player's skillful play of the entertainment game, and communicate, to the processing device, the signal including the result of the wager of virtual credits triggered by the AI NPC's action taken by the AI NPC opponent of the player during the player's skillful play of the entertainment game.

In accordance with numerous embodiments, the game world server is further constructed to determine an amount of Quanta to award to the player on a basis of the result of the wager of real world credits, where Quanta is an intermediate in-game user resource which may be used to purchase or enable additional in game resources.

In accordance with many embodiments, the game world server is further constructed to determine an amount of Quanta to award to the AI NPC on a basis of the result of the wager of virtual credits, where Quanta is an intermediate in-game user resource which may be used to purchase additional in game resources.

In accordance with various embodiments, the player's and the AI NPC's actions occur serially.

In accordance with numerous embodiments, the player's and the AI NPC's actions occur at the same time.

DETAILED DESCRIPTION

Turning now to the drawings, systems and methods for providing a parallel AI hybrid game that provides a parallel AI hybrid game are disclosed. In accordance with many embodiments of this invention, a parallel AI hybrid game integrates high-levels of entertainment content with a game of skill (an entertainment game) and a gambling experience with a game of chance (a gambling game). A parallel AI hybrid game provides for random outcomes independent of player skill while providing that the user's gaming experience (as measured by obstacles/challenges encountered, time of play and other factors) is shaped by the player's skill.

Figure 1:
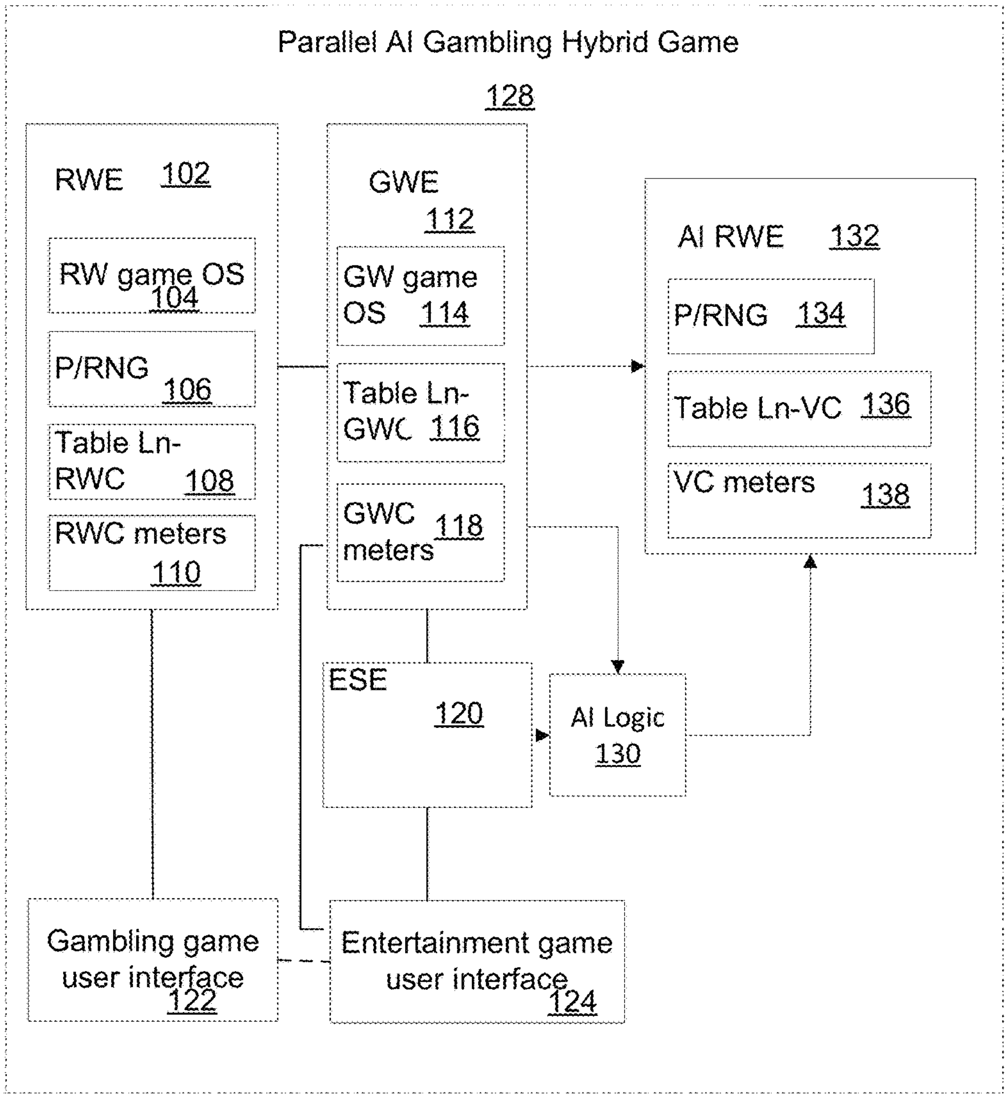
FIG. 1 illustrates a conceptual diagram of components of a parallel AI hybrid game in accordance with an embodiment of the invention.

An outcome of a gambling proposition is determined by a pseudo random or random number generator (P/RNG) or other such device that provides a random outcome in response to a wager. In accordance with some embodiments, the wager may be initiated in response to a game object related player action. A parallel AI hybrid game in accordance with an embodiment of the invention is illustrated in FIG. 1. The parallel AI hybrid game 128 includes a Real World Engine (RWE) 102, a Game World Engine (GWE) 112, an Entertainment System Engine (ESE) 120, a gambling game user interface 122 and an entertainment game user interface 124. In some embodiments, the two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is an operating system for the gambling game of the parallel AI hybrid game 128 and controls and operates the gambling game. The operation of a gambling game is enabled by real world credits (RC), such as money or other real world funds. A gambling game can increase or decrease an amount of RC based on random gambling outcomes, where the gambling proposition of a gambling game is typically regulated by gaming control bodies. In many embodiments, the RWE 102 includes a Real World (RW) operating system (OS) 104, P/RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

A pseudo random or random number generator (P/RNG) 106 includes software and/or hardware algorithms and/or processes, which are used to generate random outcomes. A level n real-world credit pay table (Table Ln-RC) 108 is a table that can be used in conjunction with the P/RNG 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a P/RNG according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game, level n, need not be the same for each level.

In accordance with some embodiments of this invention, the GWE 112 manages the overall parallel AI hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and his or her activities in the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a P/RNG. In accordance with some embodiments, GWCs are player points earned or depleted as a function of player skill, specifically as a function of player performance in the context of the entertainment game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game.

The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of this invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a parallel AI hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a parallel AI hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the parallel AI hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, parallel AI hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The parallel AI hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

In various embodiments, a player may play a hybrid game against or with an artificially intelligent (AI) non player character (NPC). As Illustrated in FIG. 1, the AI NPC's actions are controlled by AI logic 130. The AI logic 130 operates on the ESE 120 taking actions as a player would, accordingly, the AI's actions may trigger a wager in the hybrid game just as a player's actions would. However, in contrast to the player's wagers being made using RWE 102, the AI NPC's wagers are accepted in the AI RWE 132.

In many embodiments, the AI RWE 132 includes components that are symmetrical with the real credit RWE 102, such that the P/RNG or pseudo P/RNG 134 of the AI RWE 132 may operate using the same principles or using the same algorithms as the P/RNG or pseudo P/RNG of the RWE 102.

In some embodiments, the AI RWE 132 operates on Virtual Currency (VC) credits rather than a real currency credits.

In numerous embodiments, the gambling outcomes from the AI RWE are used to determine new allocations of entertainment game resources that are made available to the AI NPC.

In many embodiments, the AI NPC operates using an amount of credits that are used to fund the AI NPC's wagers.

In some embodiments, the AI control logic and the AI NPC's credits may be adjusted by the player to reflect a particular gambling style. In a particular embodiment, the AI NPC may be set to play an aggressive style where the AI NPC starts with a large amount of credit, and then places large wagers. In another embodiment, the AI NPC may be set to a passive style starting with a small number of credits and configured to place small wagers.

In accordance with some embodiments, the use of the RWE, GWE and ESE allows for the separation of control of a parallel AI hybrid game between different devices. For example, the ESE may be hosted by a device that is separate from any devices that host the RWE and/or GWE. Through separation of control of the functions of the ESE, RWE and GWE, the RWE may be isolated from the player's device, thus preventing player interference with the RWE and the gambling game. In addition, as the ESE is responsible for providing the entertainment game, parallel AI hybrid games may provide for complex entertainment games for the player as the ESE need not include the tightly regulated components of the RWE, thus providing for more freedom in ESE design. Also, separation of control allows a GWE to provide complex wager initiation rules that would not be possible if the either the ESE or the RWE were to be in control of the wager initiation.

In accordance with various embodiments, a parallel AI hybrid game allows for interleaving of continuous wagering within an entertainment game. For example, instead of wagering once, and then playing an entertainment game to completion, or playing an entertainment game to completion and then placing a wager, a parallel AI hybrid game allows a gaming system or device to be provided to a player where the gaming system or device provides a complex and interesting entertainment game with wagering incorporated throughout the entertainment game.

In various embodiments, a parallel AI hybrid game provides for feedback into the entertainment game of additional entertainment game resources that are made available in the ESE for the use of the player as the result of wagering outcomes. The additional entertainment game resources may enable portions of the entertainment game that were not available to the player without the resources.

In many embodiments, a parallel AI hybrid game provides the ability to use the parallel AI hybrid game in more than one jurisdiction, as the ESE is a component separate from the GWE and RWE. For example, the ESE may be operated as either a pure entertainment game, or as a gambling game depending on the type of characteristics of the RWE that the ESE is coupled to.

In some embodiments, a parallel AI hybrid game provides for display of an entertainment game on a player's device that the player is using to interact with the entertainment game, as well as providing a separate display of a state of a gambling game on a separate gambling game display. The separate gambling game display may be on the player's device within the same physical display device, on a separate device having a separate physical screen, or on a separate physical display device on the player's device.

In some embodiments, a parallel AI hybrid game provides for at least two RWEs. One RWE may be regulated and approved by a regulatory body for wagering of RC by a human player. The other RWE may be unregulated and used for wagering by an artificially intelligent non-player character. Through use of such an arrangement, a flexible architecture may be provided wherein the RWE used by the artificially intelligent non-player character need not be included in a regulated device.

Figure 2:
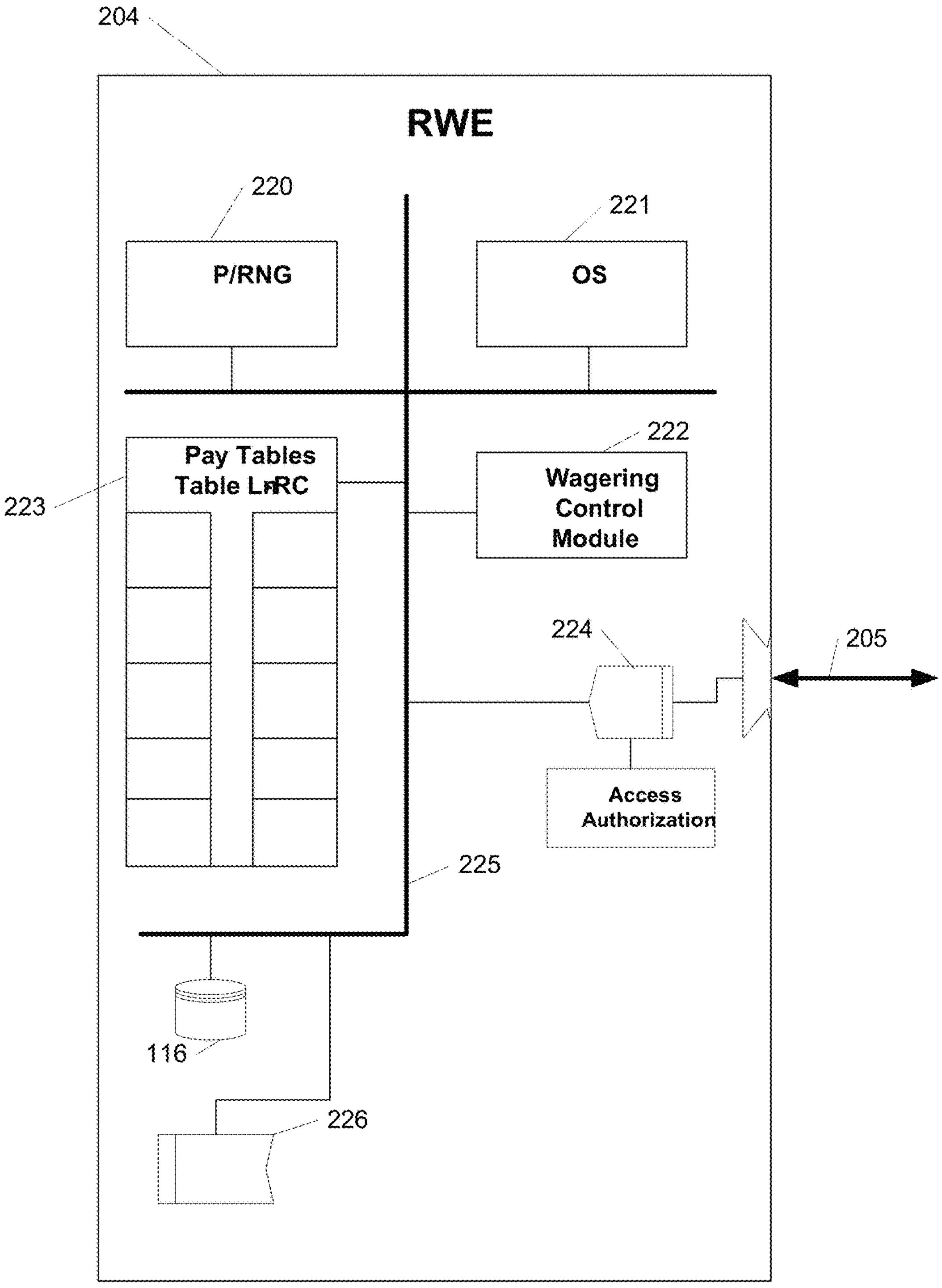
FIG. 2 illustrates a conceptual diagram of aspects of a Real World Engine (RWE) of a parallel AI hybrid game in accordance with some embodiments of the invention.

The components provided by the RWE for a parallel AI hybrid game in accordance with embodiments of the invention are shown in FIG. 2. In accordance with embodiments of the invention, the RWE includes an internal bus 225 that connects an operating system OS 221, a pseudo random or random number generator (P/RNG) 220, one or more pay tables (Table Ln-RC) 223, a wagering control module 222, an authorization access module 224, and a RC credit meter 226 that are included in the RWE 204. The RW OS 221 controls the functions of the RWE 204. The P/RNG 220 includes one or more P/RNGs that are used to produce random numbers for use in resolving gambling events and other process requiring a random number to determine an outcome. The one or more pay tables (Table Ln-RC) 223 control the functions of the RWE and contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 226 maintains a record of the amount of RC which a player has deposited in the game and has been accumulated by the player.

An external connection allows the RWE 204 to interface to another system or device, which is shown in FIG. 2 as the Internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
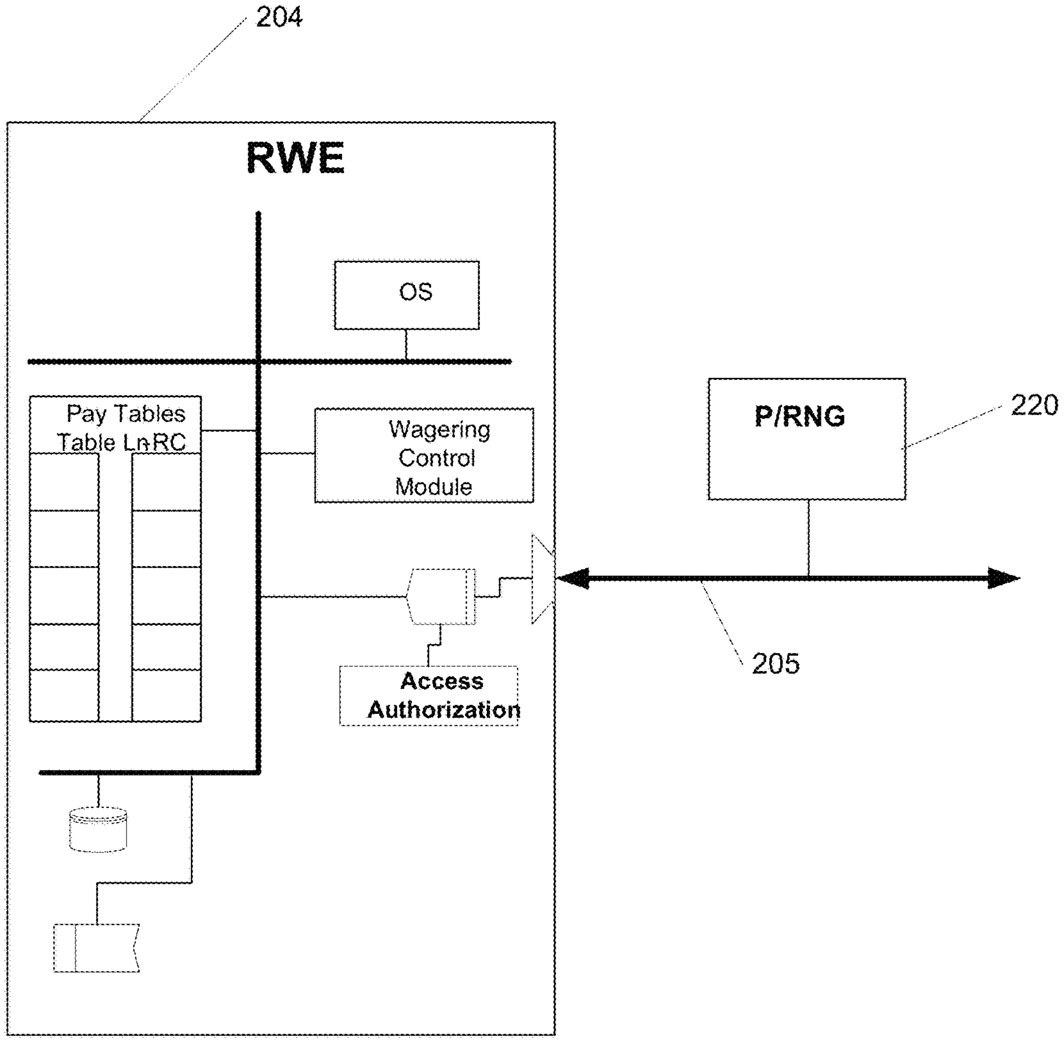
FIG. 3 illustrates a conceptual diagram of aspects of a Real World Engine (RWE) of a parallel AI hybrid game in accordance with some other embodiments of the invention.

In some embodiments, the RWE 204 communicates with external systems to provide various functions of a parallel AI hybrid game in accordance with embodiments of the invention. The components of an RWE 204 that communicate with an external system to provide a component of the RWE 204 in accordance with embodiments of the invention are shown in FIG. 3. The RWE 204 shown in FIG. 3 is similar to the RWE shown in FIG. 2. However, the P/RNG 220 is an external system connected to the RWE 204 by the Internet 205 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the embodiment illustrated in FIG. 3. However, any of the components could be external systems without departing from the invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the Internet 205 in other embodiments of the invention. Other examples of interfaces include, but are not limited to, a LAN, a USB interface, or some other method by which two electronic and software constructs could communicate with each other.

Figure 4:
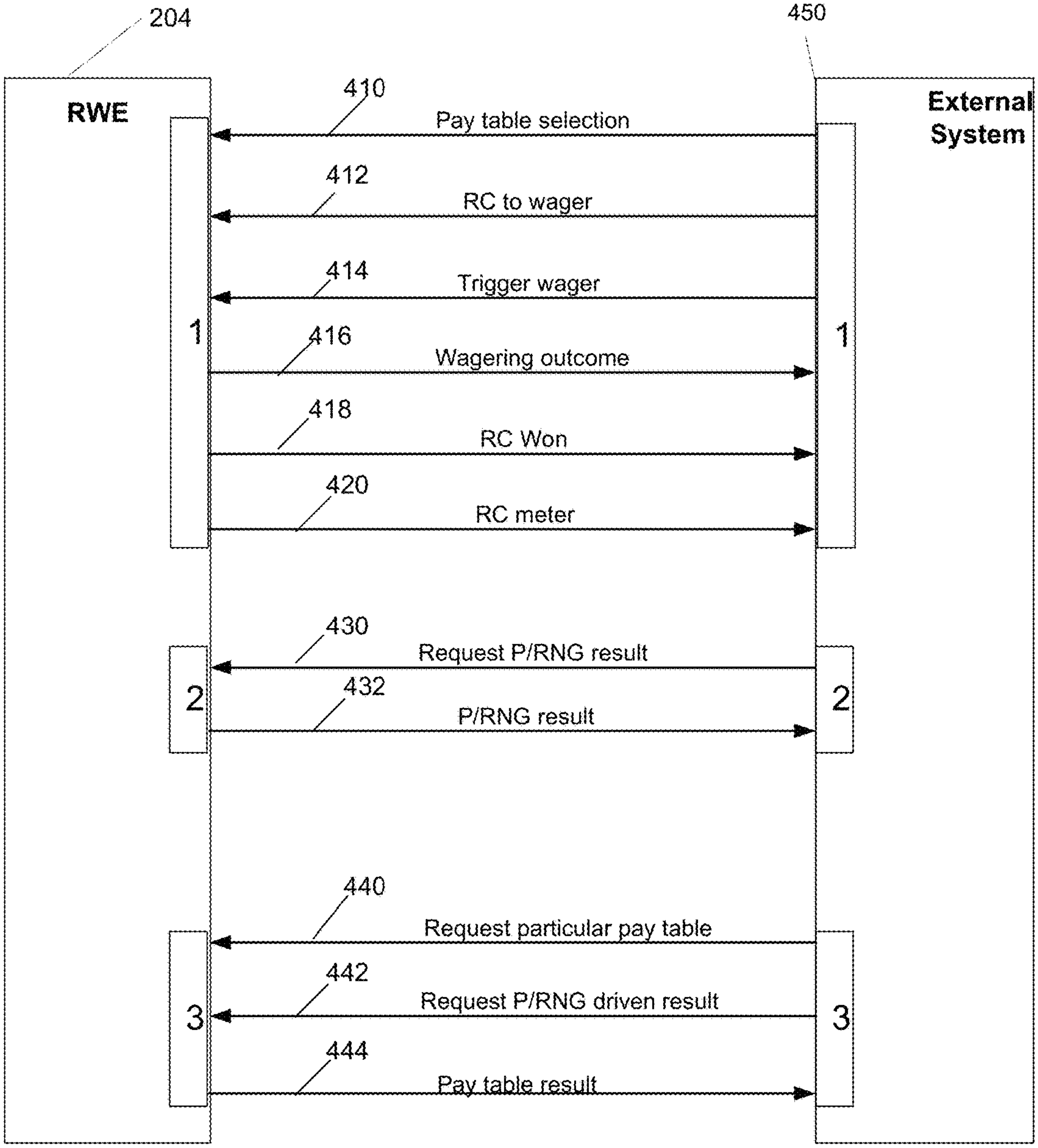
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with many embodiments of the invention, the primary function of the RWE 204 is to manage wagering events and to provide random (or pseudo random) numbers from a P/RNG. At the top of the figure, a 6 component communication exchange grouped by the "1" box is shown for a wager on a proposition in a gambling event during a parallel AI hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an P/RNG result support from the RWE 204. In this exchange, the external system 450 requests an P/RNG result from the RWE 204 (430). The RWE 204 returns a P/RNG result to the external system 450 in response to the request (432). The result may be generated as a function of the internal P/RNG in the RWE 204, or from a P/RNG external to the RWE 204 to which the RWE 204 is connected.

A third communication exchange between the RWE 204 and the external system 450 in accordance with embodiments of the invention that is shown in FIG. 4 is grouped by the "3" box in the figure and relates to the external system 450 wanting support on coupling an P/RNG result to a particular Pay Table contained in the RWE 204. In this exchange, the external system 450 instructs the RWE as to the pay table (Table Ln-RC) to use (440). The external system (450) then requests a result whereby the P/RNG result is coupled to the requested Pay Table (442). The result is returned to the external system 450 by RWE 204 (444). Such an aspect is different from the first exchange shown by the box "1" sequence in that no actual RC wager is conducted. However, such a process, t, might be useful in coupling certain non-RC wagering entertainment game behaviors and propositions to the same final resultant wagering return which is understood for the parallel AI hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
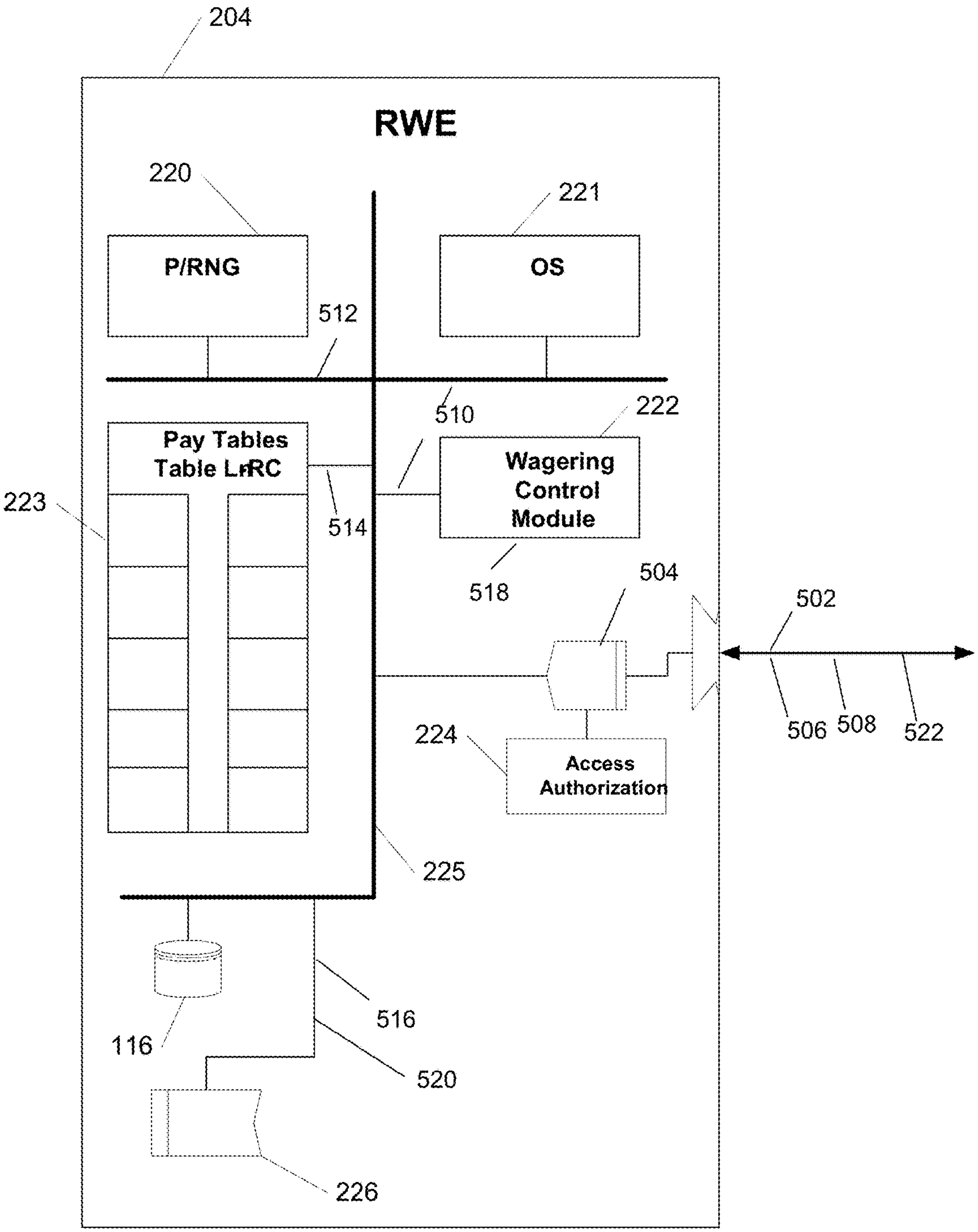
FIG. 5 illustrates a diagram of a process flow and signaling in a Real World Engine (RWE) to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204 (502). The Access Authorization Module determines that the external system is authorized to connect to RWE 204 (504) and transmits an authorization response to the external system. The external systems provide a request for a gambling event to be performed to the RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execution (510). In response to the request to execute the gambling event, the wager control module 222 requests an P/RNG result from the P/RNG 220 (512); retrieves a proper pay table or tables from the pay tables 223 (514); adjusts the RC of the player in the RC repository 226 as instructed (516); applies the P/RNG result to the particular pay table or tables (518); and multiplies the resultant factor from the Pay Table by the amount of RC to determine the result of the wager (518). Wager Control Module 222 then adds the amount of RC won by the wager to the RC repository 226 (520); and provides he outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
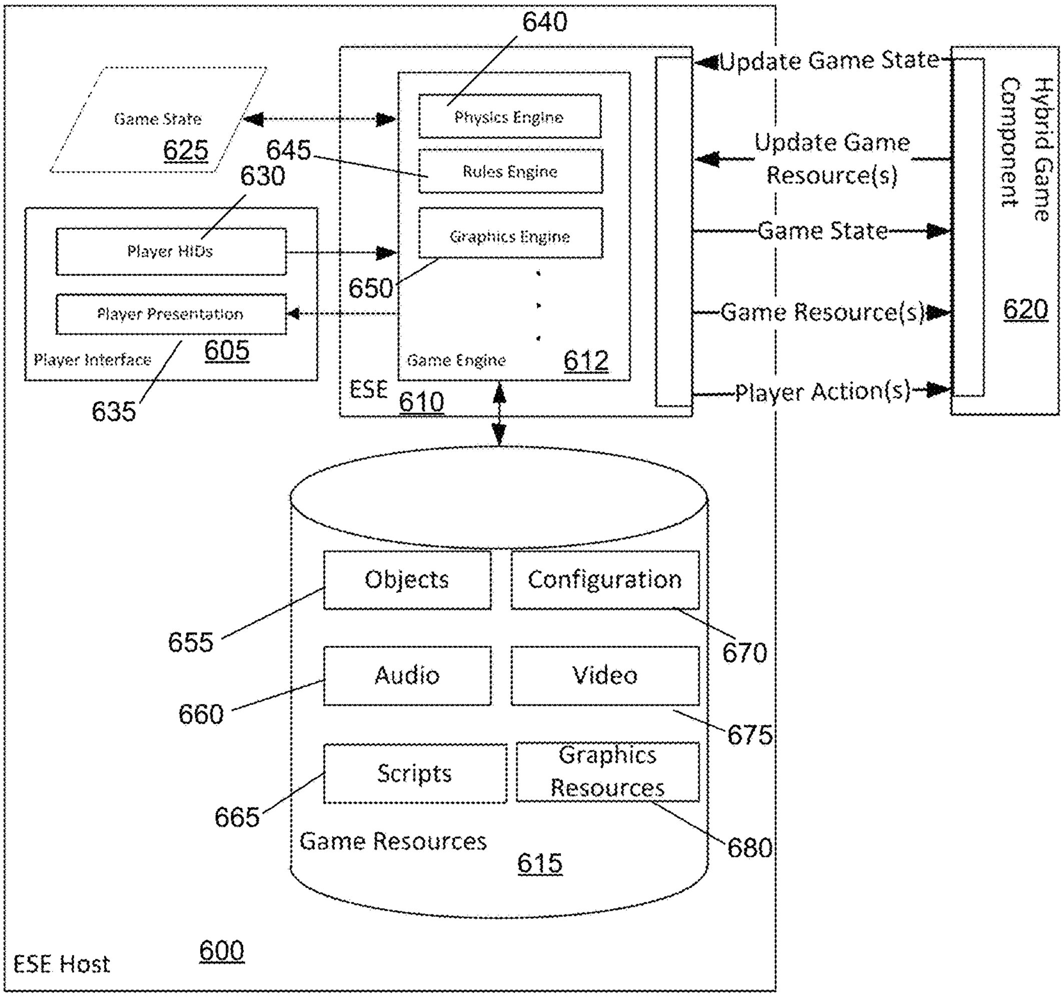
FIG. 6 illustrates a conceptual diagram of aspects of an Entertainment System Engine (ESE) in accordance with embodiments of the invention.

A block diagram of components of an ESE being provided by an ESE host 600 for a parallel AI hybrid game in accordance with embodiments of the invention is shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an P/RNG that may be used for influencing or determining certain variables and/or outcomes to provide a randomizing influence on gameplay, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various gameplay features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process can loop in a game loop continuously while the player plays the game.

In some embodiments, the ESE 610 is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE 610 is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a parallel AI hybrid game, such as a GWE. The ESE 610 and the other parallel AI hybrid game component 620 communicate with each other using the interfaces, such as by passing various types of data and sending and receiving messages, status information, commands and the like. Examples of communications include, but are not limited to, requesting by the parallel AI hybrid game component 620 that the ESE 610 update the game state using information provided by the other component; requesting, by the parallel AI hybrid game component 620, that the ESE 610 update one or more game resources using information provided by the parallel AI hybrid game component 620; the ESE 610 providing all or a portion of the game state; the ESE 610 providing one or more of the game resources to the parallel AI hybrid game component 620; and the ESE 610 communicating player actions to the other parallel AI hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various ways in which to operate hybrid games are discussed in PCT Application Nos. PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
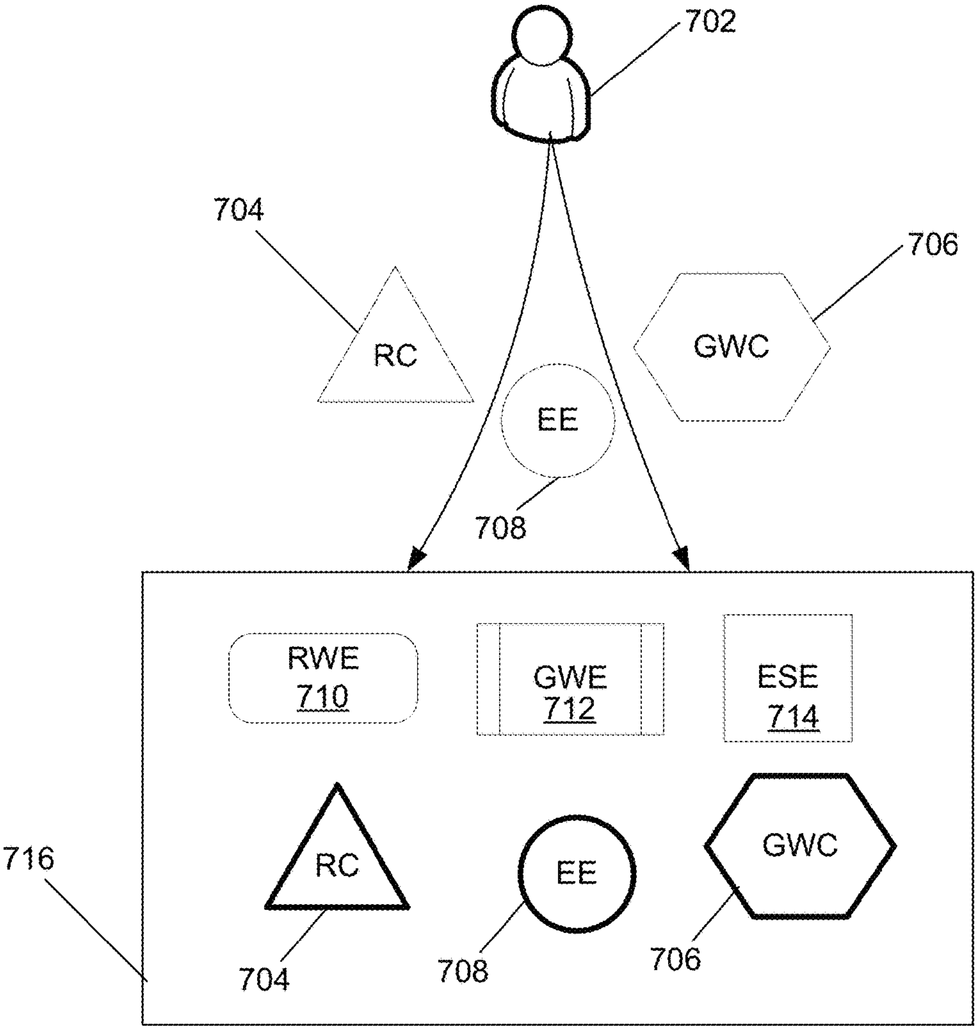
FIG. 7 illustrates a conceptual diagram of interactions between a user and a parallel AI hybrid game in accordance with embodiments of the invention.

In accordance with some embodiments, a player can interact with a parallel AI hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in a parallel AI hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a parallel AI hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a parallel AI hybrid game or in a remote server.

Figure 8:
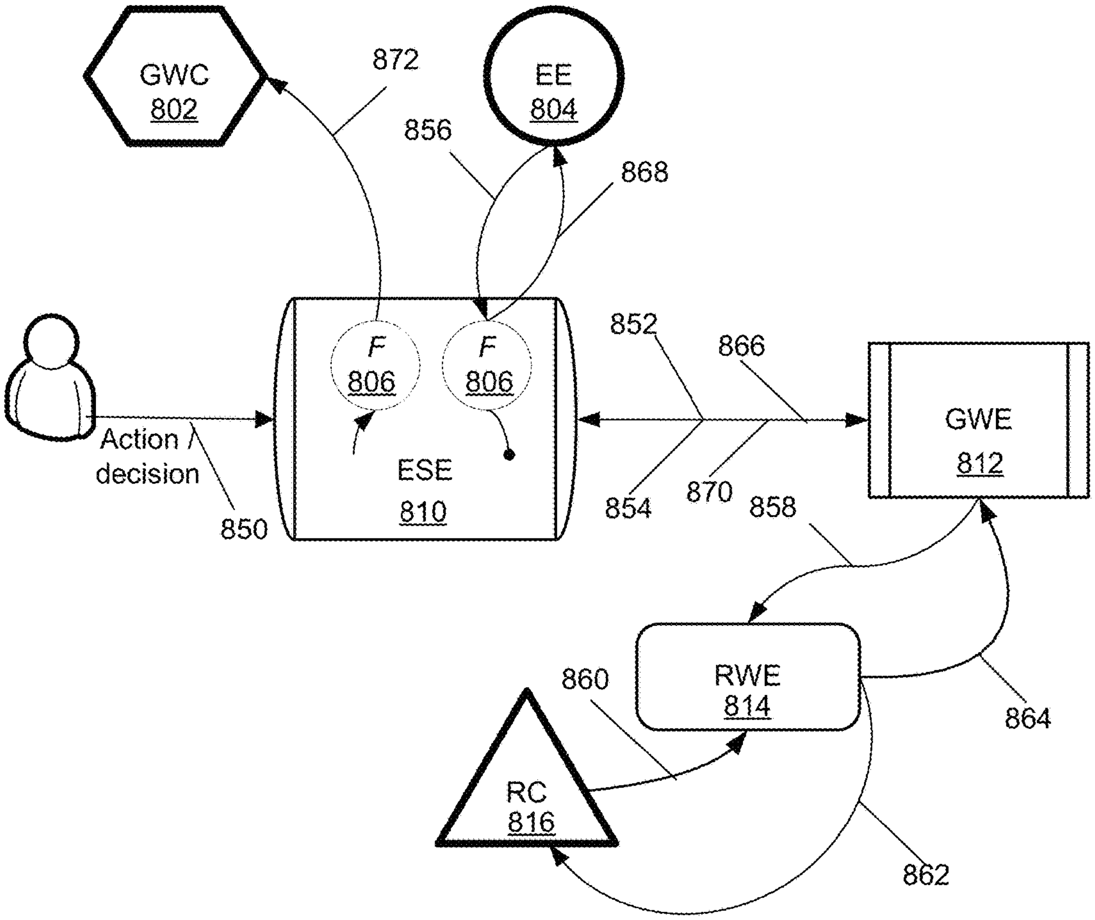
FIG. 8 illustrates a conceptual diagram of the interplay between aspects of a parallel AI hybrid game in accordance with some embodiments of the invention using Real World Currency (RC).

A conceptual diagram that illustrates the interplay between aspects of a parallel AI hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the parallel AI hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a parallel AI hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during gameplay. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a parallel AI hybrid game, but is not intended to be exhaustive and only lists only one of numerous possibilities of how a parallel AI hybrid game may be configured to manage its fundamental credits.

Figure 9:
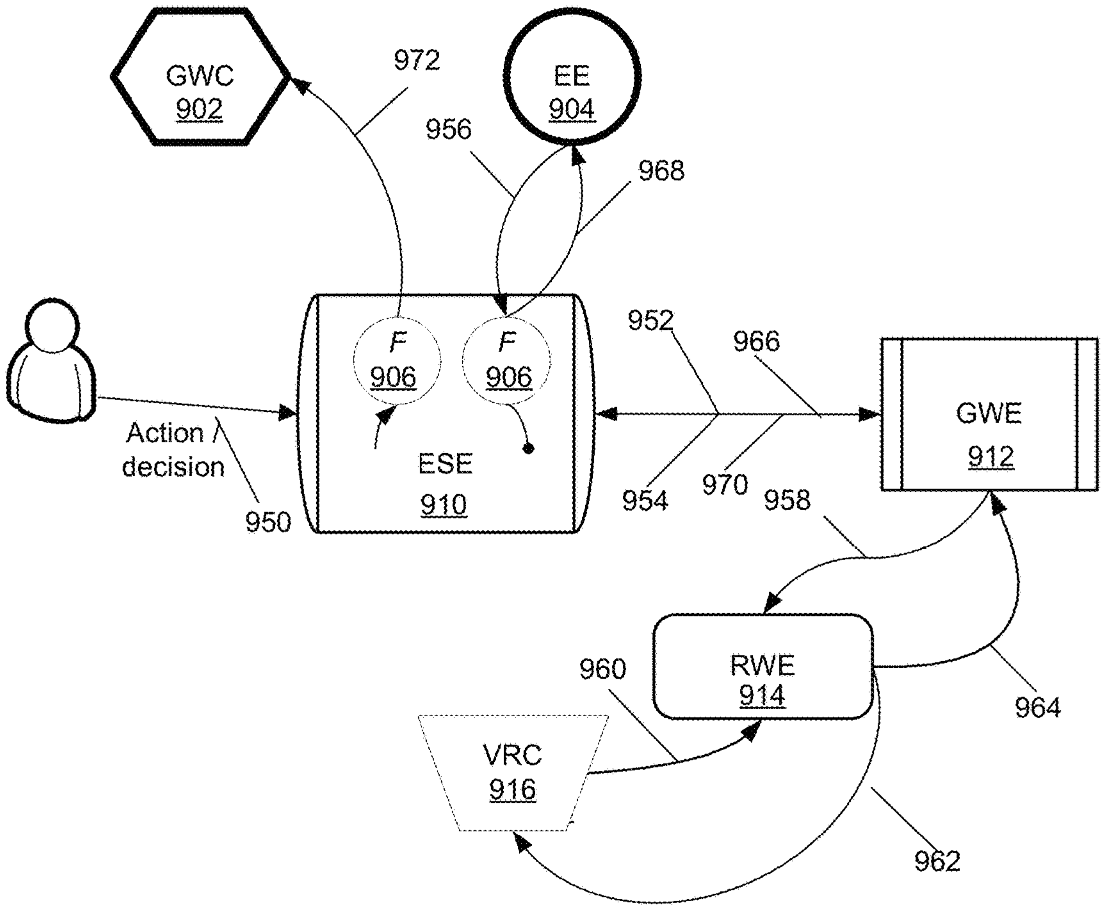
FIG. 9 illustrates a conceptual diagram of the interplay between aspects of a parallel AI hybrid game in accordance with other embodiments of the invention using Virtual Real World Currency (VRC).

A conceptual diagram that illustrates the interplay between aspects of a parallel AI hybrid game in accordance with an embodiment of the invention using virtual real world credit (VRC) is illustrated in FIG. 9. As seen in the FIG. 9, substituting VRC in place of RC is effected without impact to the architecture or operation of the parallel AI hybrid game. The implementation of FIG. 9 is not the only embodiment using virtual currency within a parallel AI hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a parallel AI hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the parallel AI hybrid game that Triax Jacks would be wagered in place of RC, such that the parallel AI hybrid game could be played for free, or with played with operator sponsored Triax Jacks.

Returning to the process in FIG. 9, the following may occur during use of the parallel AI hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Parallel AI Hybrid Game

Figure 10:
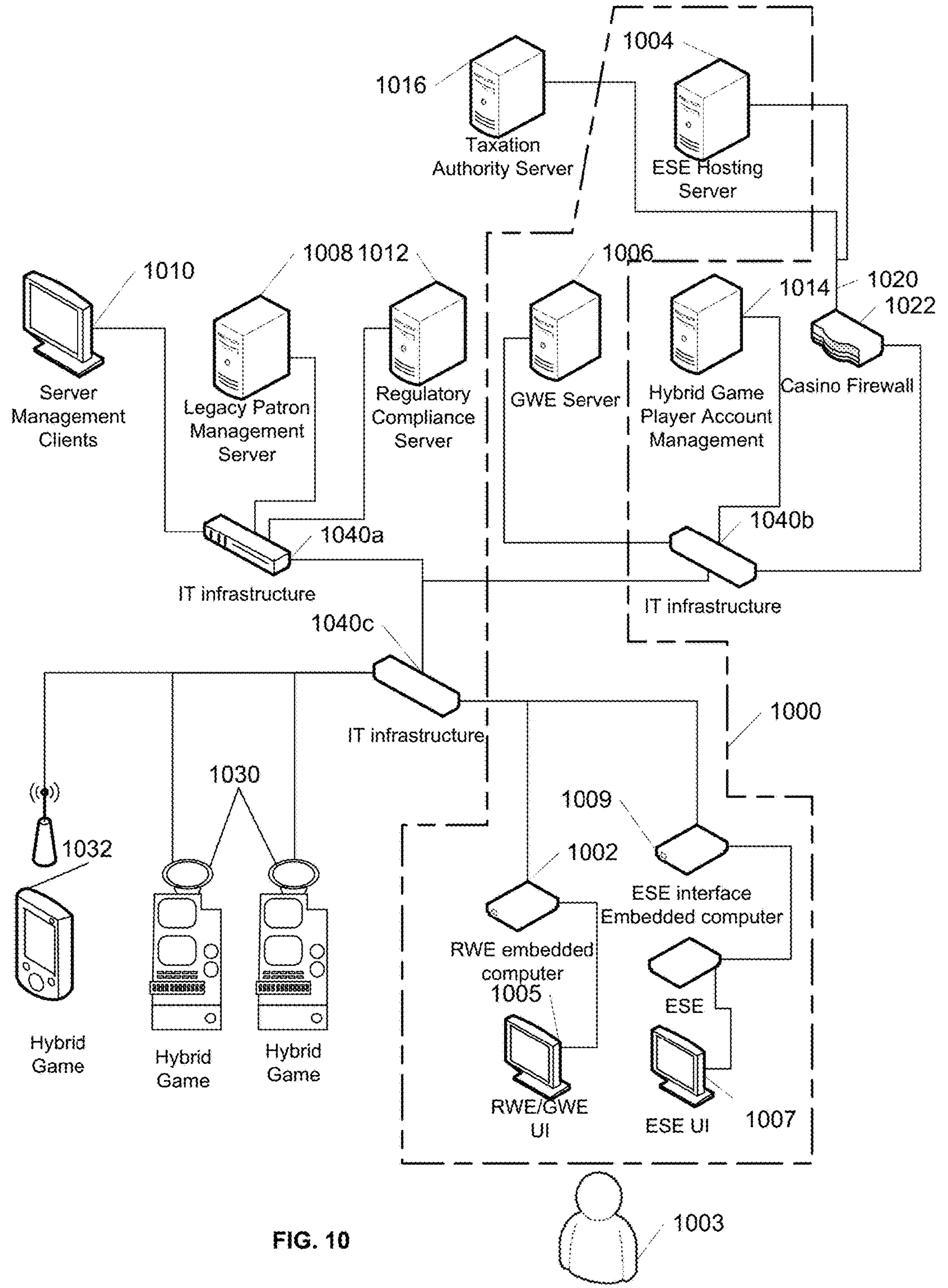
FIG. 10 illustrates a system diagram of an implementation of a network based parallel AI hybrid game in accordance with another embodiment of the invention.

A system diagram that illustrates an implementation of a network distributed parallel AI hybrid game with a GWE local server in accordance with embodiments of the invention is illustrated in FIG. 10. In the figure, the parallel AI hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a parallel AI hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which a parallel AI hybrid game 1000 might be inevitably be connected, and indeed one might expect there would be others, but rather provides an example of a set of a sub-set of systems which would be present in an exemplary embodiment of an installation.

Figure 11:
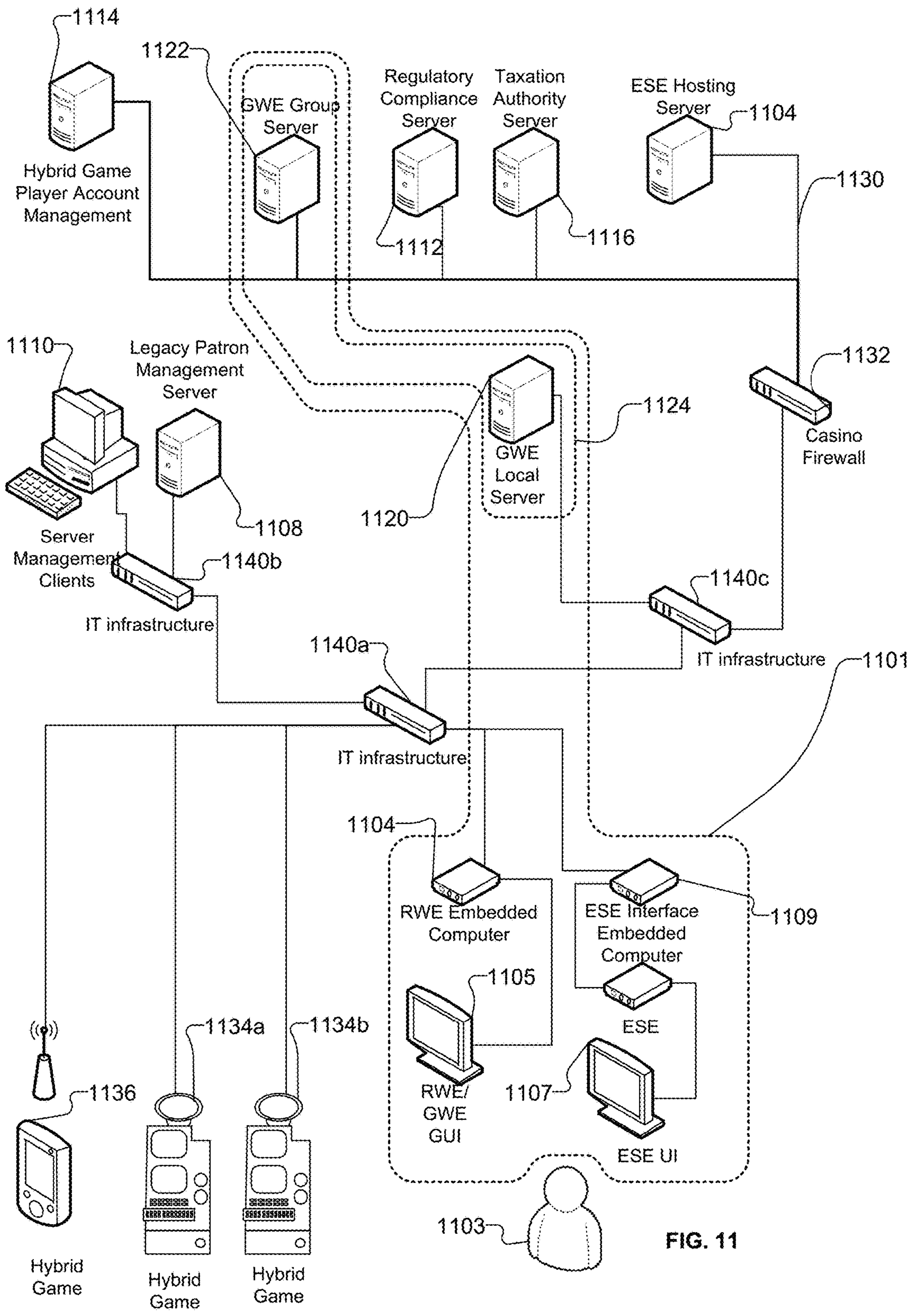
FIG. 11 illustrates a system diagram of an implementation of an Internet based parallel AI hybrid game in accordance with an embodiment of the invention.

FIG. 11 is a diagram showing another implementation of a parallel AI hybrid game in accordance with an exemplary embodiment. In the figure, the parallel AI hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded parallel AI hybrid game components via communications network such as the Internet 1130 through a firewall 1132. FIG. 11 also illustrates various other systems, which may reside outside the bounds of the casino and are connected to the framework via communications network. The end devices utilized for user interfaces for a parallel AI hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which a parallel AI hybrid game might be inevitably be connected, and indeed one might expect there would be others, but rather provides an example of a set of a sub-set of systems which would be present in an exemplary embodiment of an installation.

Figure 12:
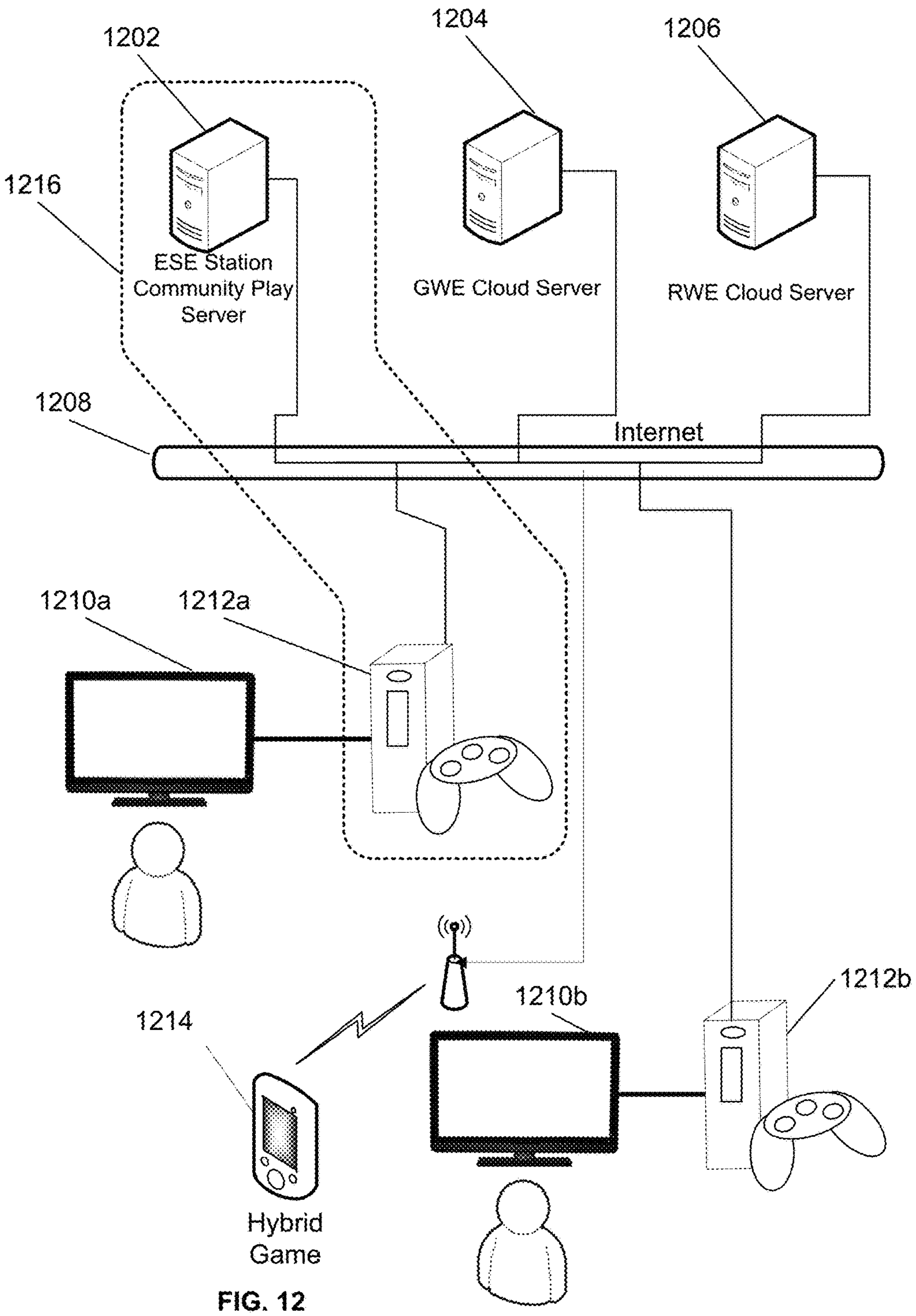
FIG. 12 illustrates a system diagram of an implementation of a cloud based parallel AI hybrid game in accordance with an embodiment of the invention.

A system diagram that illustrates an implementation of network a cloud based parallel AI hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of parallel AI hybrid games over the Internet 1208. Each parallel AI hybrid game includes a local ESE 1212*a* or 1212*b* (such as, but not limited to, a video game console or a gaming computer system) that interfaces with a remote ESE server 1002. Processes performed by an ESE 1212*a* services can be performed in multiple locations, such as, but not limited to, remotely on an ESE server 1202 and locally on a local ESE 1212*a*. In addition, a parallel AI hybrid game may include a Personal Digital Assistant (PDA) 1214 or other type of mobile computing device game coupled to the ESE hosting server 1202, thus providing the opportunity for a player to play a parallel AI hybrid game on the PDA through a mobile phone or data network.

There are many possible permutations of how a parallel AI hybrid game could be constructed, with FIGS. 10, 11 and 12 showing only three possible permutations and provided as examples, which are not intended to suggest limitations to the forms of the architecture. Other embodiments include a version where the entire parallel AI hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
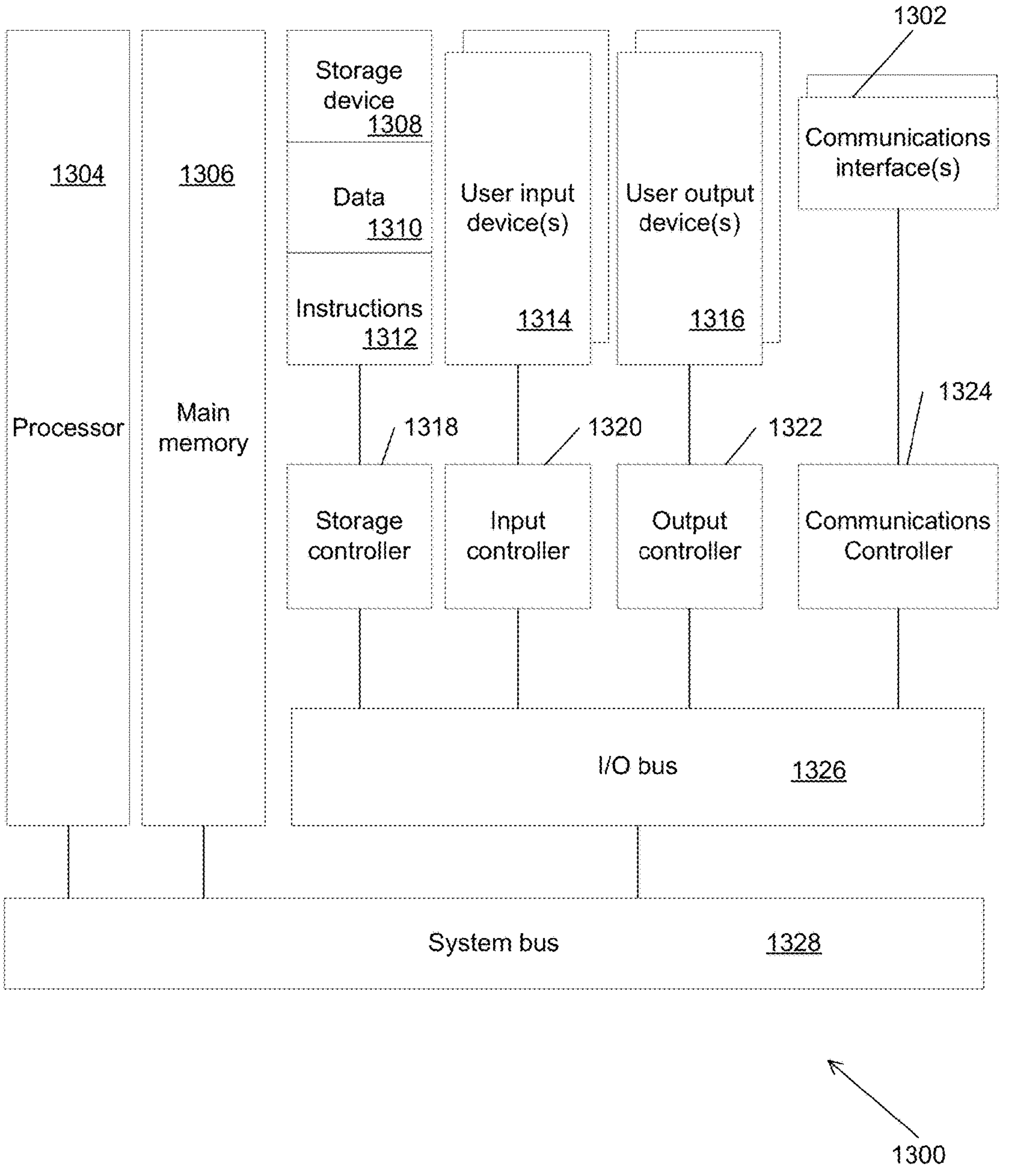
FIG. 13 illustrates a block diagram of components of a device implementing a parallel AI hybrid game in accordance with an embodiment of the invention.

Any of a variety of processing apparatuses can host various components of a parallel AI hybrid game in accordance with embodiments of the invention. In accordance with embodiments of the invention, these processing apparatuses can include, but are not limited to, a server, a client, a mobile device such as a smartphone, a personal digital assistant or the like, a wireless device such as a tablet computer or the like, an electronic gaming machine, a general purpose computer, a gaming console, a computing device and/or a controller. A processing apparatus that is constructed to implement a parallel AI hybrid game in accordance with embodiments of the invention is illustrated in FIG. 13. In the processing apparatus 1300, a processor 1304 is coupled to memory 1306 by a bus 1328. The processor 1304 is also coupled to non-transitory machine-readable storage media, such as a storage device 1308 that stores executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a parallel AI hybrid game. The processor 1304 can utilize various input and output devices in accordance with the instructions and the data in order to create and operate user interfaces for players or operators of a parallel AI hybrid game (such as but not limited to a casino that hosts the parallel AI hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Operation of a Parallel AI Hybrid Game

Figure 14:
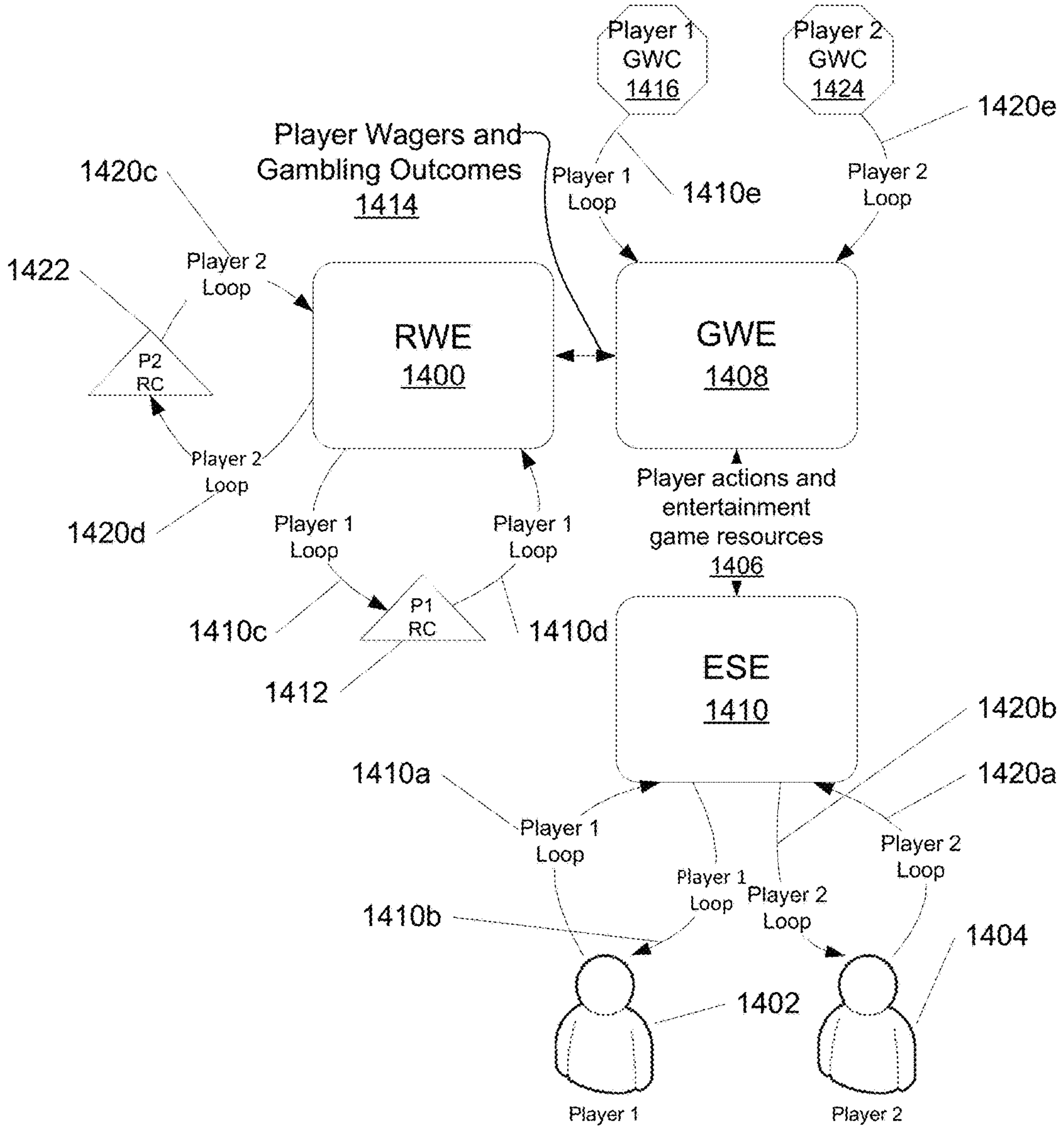
FIG. 14 illustrates credit and data flows within an embodiment of a head to head hybrid game, with a single real world engine (RWE) 1400 for a gambling game in accordance with embodiments of the invention.

FIG. 14 illustrates credit and data flows within an embodiment of a head to head hybrid game, with a single real world engine (RWE) 1400 for a gambling game in accordance with embodiments of the invention. Although only two players are illustrated by way of example, it should be understood that the apparatuses and processes described herein are applicable to any number of players. As illustrated, a player's (such as player 1 1402 and player 2 1404) actions 1406 are communicated to a GWE 1408 by an ESE 1410. One or more of player 1 1402's actions (as indicated by player 1 loop 1410*a* and 1410*b*), when communicated to the GWE 1408, may trigger wagers that are made in the RWE 1400 (as indicated by player 1 loop 1410*c* and 1410*d*). The wagers are made using player 1 1402's real credits (RC) 1412. Gambling outcomes 1414 generated by the RWE 1400 are communicated to the GWE 1408 which then translates the gambling outcome into entertainment game resources 1406 that are supplied to player 1402 for use in the entertainment game. As player 1402 uses the entertainment game resources, the player 1402 accumulates game world credit (GWC) 1416 or the like (as indicated by player 1 loop 1410*e*).

Actions taken by another player (such as player 2 1404) are also communicated to the GWE 1408 (as indicated by player 2 loop 1420*a* and 1420*b*). The GWE 1408 may use player 2 1404's actions to generate wagers using RC 1422 associated with player 2 1404, in the RWE 1400 (as indicated by player 2 loop 1420*c* and 1420*d*). Gambling outcomes 1414 generated by the RWE 1400 are communicated to the GWE 1408 which may then translate the gambling outcomes into entertainment game resources 1406 that may be used by player 2 1404. As player 2 1404 uses the entertainment game resources, the player 2 1404 may accumulate game world credit (GWC) 1424 or the like (as indicated by player 2 loop 1420*e*).

In some embodiments, each player has a respective ESE that they use independently of other players. In several embodiments, each player has a respective GWE that is dedicated to that player's play session.

In many embodiments, any of the components of an ESE, GWE and/or RWE may be operatively connected through a network, such as a local area network or a wide area network.

In various embodiments, a head to head hybrid game, as illustrated in FIG. 14, may be used to implement a turn based game, such as a board game or the like. In a turn based game, the two player's actions occur serially (one after the other), that is, the two player's actions in playing the entertainment game do not occur at the same time.

In numerous embodiments, a head to head hybrid game, as illustrated in FIG. 14, may be used to implement an action entertainment game, such as a race simulation or a first person shooter. In such an implementation, the two player's actions may occur asynchronously, and/or in parallel, that is, both of the player's may take actions at the same time or at different times without any imposed sequence or order.

An example of an entertainment game resource is Quanta, where Quanta is an intermediate in-game user resource, which may be used to purchase or enable additional in game resources, such as, but not limited to enabling elements (EE) or actionable elements (AE), which may change the state of the entertainment or skill based game and/or offer the player benefits or advantages in the entertainment or skill based game. Quanta, is awarded to the player as a result of the outcome of wagers made to the RWE. Typically a winning wager may result in Quanta being added, where as a losing result or push may not result in Quanta being added. While this is a typical case, this may not be the case in all instances. The algorithm for awarding Quanta in-game, may vary from game to game and/or from operator to operator.

Figure 15:
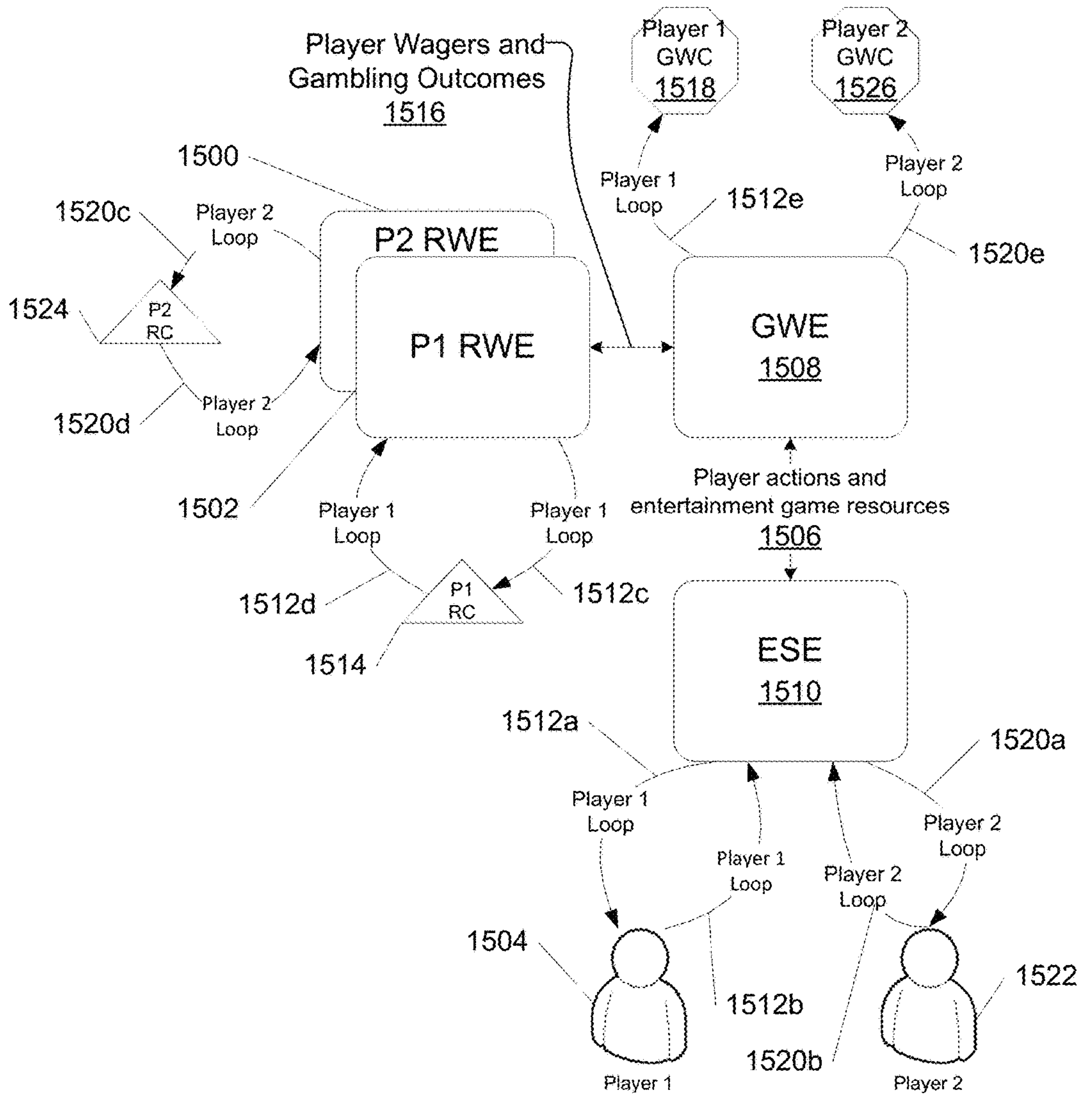
FIG. 15 illustrates credit and data flows within a head to head hybrid game, with multiple real world engines (RWEs) for implementing one or more gambling games in accordance with embodiments of the invention.

FIG. 15 illustrates credit and data flows within an embodiment of head to head hybrid game, with multiple real world engines (RWE), such as P1 RWE 1500 and P2 RWE 1502, for implementing one or more gambling games in accordance with embodiments of the invention. Although only two players are illustrated by way of example, it should be understood that the apparatuses and processes described herein are applicable to any number of players. In various embodiments, a player's (such as player 1 1504) actions are communicated (1506) to a GWE 1508 by an ESE 1510. One or more of player 1's 1504 actions (as denoted by player 1 loop 1512*a* and 1512*b*) may trigger wagers (as denoted by player 1 loop 1512*c* and 1512*d*) that are made in an RWE, denoted as P1 RWE 1502, which only processes wagers for player 1 1504. Wagers are made using the player's real credits (RC) 1514. Gambling outcomes generated by the RWE are communicated (1516) to the GWE which then may translate the gambling outcome into entertainment game resources that are supplied (1506) to player 1 1504 for use in the entertainment game. As player 1 uses the entertainment game resources, the player accumulates (as indicated by player 1 loop 1512*e*) game world credit (GWC) 1518 or the like.

In numerous embodiments, actions (as indicated by player 2 loop 1520*a* and 1520*b*) taken by a second player (player 2 1522) are also communicated (1506) to the GWE 1508. The GWE 1508 may use player 2's actions to generate wagers (as indicated by player 2 loop 1520*c* and 1520*d*) using RC 1524, associated with player 2 1522, in a second RWE, denoted as P2 RWE 1500, which only processes transactions for player 2 1522. Wagers are made using the player's real credits (RC) 1524. Gambling outcomes generated by the RWE are communicated (1516) to the GWE 1508 which then may translate a gambling outcome into entertainment game resources that are supplied to player 2 1522 for use in the entertainment game. As player 2 1522 uses the entertainment game resources, the player may accumulate (as indicated by player 2 loop 1520*e*) game world credit (GWC) 1526 or the like.

In various embodiments, multiple RWE's may be used, because of operator and/or regulatory policies.

In some embodiments, a head to head hybrid game, as illustrated in FIG. 15, may be used to implement a turn based game, such as a board game or the like. In a turn based game, the two player's actions occur serially (one after the other), that is, the two players actions in playing the entertainment game do not occur at the same time.

In numerous embodiments, a head to head hybrid game, as illustrated in FIG. 15, may be used to implement an action entertainment game, such as a race simulation or a first person shooter. In such an implementation, the two player's actions may occur asynchronously, and/or in parallel, that is, both the player's may take actions at the same time or at different times without any imposed sequence or order.

In some embodiments, each player has a respective ESE that they use independently of other players. In several embodiments, each player has a respective GWE that is dedicated to that player's play session.

In many embodiments, any of the components of an ESE, GWE and/or RWE may be operatively connected through a network, such as a local area network or a wide area network.

Figure 16:
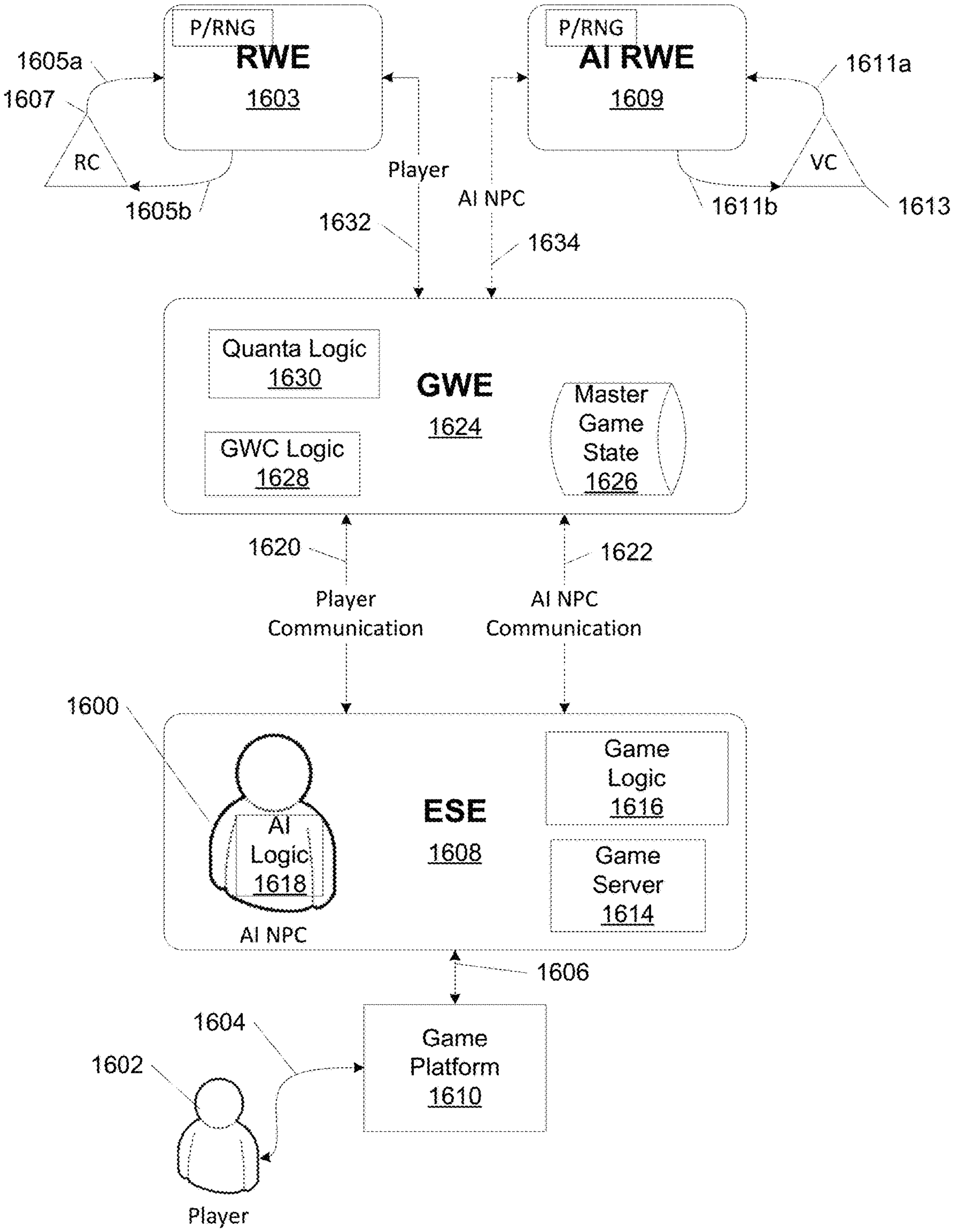
FIG. 16 illustrates credit and data flows within a head to head hybrid game, which utilizes an artificially intelligent (AI) non-player character (NPC) to oppose a human player in accordance with embodiments of the invention.

FIG. 16 illustrates credit and data flows within a head to head hybrid game, which utilizes an artificially intelligent (AI) non-player character (NPC) 1600, to oppose a (human) player 1602 in accordance with embodiments of the invention. Although only a single AI NPC and player are illustrated by way of example, it should be understood that the apparatuses and processes described herein are applicable to any number of AI NPCs and players. As further illustrated, in FIG. 16, a parallel AI hybrid game architecture is utilized, such as the architecture as described in FIG. 1. The architecture features a player RWE 1603 having a P/RNG for executing wagers and determining wagering outcomes (as indicated by arrows 1605*a* and 1605*b*) for the player 1602 using the player's RC 1607. The architecture further features an AI RWE 1609 for executing wagers and determining wagering outcomes (as indicated by arrows 1611*a* and 1611*b*) for the AI NPC 1600 using virtual credit (VC) 1613 of the AI NPC As illustrated, a player's instructions 1604 may be communicated (1606) to an ESE 1608, via a game platform 1610. The game platform may be a device separate from the ESE, such as but not limited to one or more of the following; a game console (such as XBOX® or Playstation®), a personal computer, a smartphone, a tablet computing device, or a dedicated game console (similar to a slot machine or video poker machine). In some embodiments, the game platform and the ESE are the same device.

In many embodiments, the ESE may include a game server 1614, to manage play between the player 1602 and the AI NPC 1600. The ESE 1608 may also include, game logic 1616, which is effectively the software that is the entertainment or skill based game. The ESE 1608 may additionally include the AI NPC 1600, which includes the AI logic 1618, to oppose the player in the entertainment and/or skill based game.

In various embodiments, the ESE 1608 will communicate player actions 1620 and/or AI NPC actions 1622 to the GWE 1624. The two types of communication (player or AI NPC) are shown separately in the figure to illustrate that the GWE 1624 will be able to make a distinction between the two, when an AI NPC is playing, and not a second (human) player.

In numerous embodiments, the GWE 1624 may include a master game state 1626 database or record, as well and GWC logic 1628 and Quanta and/or other game resource logic 1630. GWC logic 1628 awards GWC to each player (or the player and the AI) based upon actions and success in the entertainment/skill game. Quanta logic 1630 may award Quanta based upon gambling results from an RWE as well as other factors in the entertainment game. The GWE 1624 may also trigger (1632 and/or 1634) gambling wagers and outcomes in one or both of RWEs based upon one or more actions taken by the player 1602 and/or one or more actions taken by the AI NPC 1600.

In various embodiments, the RWE incorporates a pseudo random or random number generator (P/RNG) based gambling engine, which is responsible for processing the players real credit (RC) wagers. In some embodiments, a second RWE may exist with the primary purpose of processing virtual credit (VC) wagers as triggered by the play of the AI NPC 1602. In such an embodiment, the AI RWE is a P/RNG based gambling engine using a P/RNG and pay tables that mirror the wagering opportunities available to the player 1602.

In various embodiments of a parallel AI hybrid game, may provide a more realistic head to head game experience, as the AI NPC will have the same potential advantages (to earn Quanta or other resources) or disadvantages (to lose their VC, and effectively go broke), as a real player would have. This should offer a more balanced and therefore more entertaining play experience to the player.

In various embodiments, a head to head hybrid game, as illustrated in FIG. 16, may be used to implement a turn based game, such as a board game or the like. In a turn based game, the player's and the AI NPC's actions occur serially (one after the other), that is, the two players actions in playing the entertainment game do not occur at the same time.

In numerous embodiments, a head to head hybrid game, as illustrated in FIG. 16, may be used to implement an action entertainment game, such as a race simulation or a first person shooter. In such an implementation, the player's and the AI NPC's actions may occur asynchronously, and/or in parallel, that is, both the player and AI NPC may take actions at the same time or at different times without any imposed sequence or order.

In various embodiments, a parallel AI hybrid game may exist for various types of head to head or multi-player games.

In some embodiments, the AI NPC and the player have respective ESEs that they use independently of other players. In several embodiments, the AI NPC and the player have respective GWEs that are dedicated to that player's play session.

In many embodiments, any of the components of an ESE, GWE, player RWE, and AI RWE may be operatively connected through a network, such as a local area network or a wide area network.

In an embodiment of a parallel AI hybrid game, based upon the skill based crossword puzzle game, similar to the game of Scrabble®, an AI NPC may oppose a player, and have the same opportunities through virtual gambling to earn Quanta and/or other game resources, which may be used to provide an advantage in the crossword puzzle game. As an example, Quanta may be used by the AI NPC to purchase letter or word multiplier background tiles, wild card tiles, hints, etc. These are the same items the opposing player may purchase with Quanta they have won in the hybrid game.

In an embodiment of a parallel AI hybrid game, based upon the card game UNO®, an AI NPC may oppose one or more players, and have the same opportunities through virtual gambling to earn Quanta and/or other game resources, which may be used to provide an advantage in the card game. As an example, Quanta may be used by the AI NPC to purchase the ability to play more than one card in a turn, the ability to peek at another players hand, the ability to swap cards or hands with another player, etc. These are the same items the opposing player(s) may purchase with Quanta they have won in the hybrid game.

In an embodiment of a parallel AI hybrid game, based upon the first person shooter game Doom 3®, an AI NPC may oppose and/or play in a co-operative mode with one or more players, and have the same opportunities through virtual gambling to earn Quanta and/or other game resources, which may be used to provide an advantage in the first person shooter game. As an example, Quanta may be used by the AI NPC to purchase the ability to purchase a special weapon, to purchase special armor, to enter an invincibility phase in the game, etc. These are the same items the opposing or co-operative player(s) may purchase with Quanta they have won in the hybrid game.

In an embodiment of a parallel AI hybrid game, based upon the guessing game of battleship, an AI NPC may oppose a player, and have the same opportunities through virtual gambling to earn Quanta and/or other game resources, which may be used to provide an advantage in the game of battleship. As an example, Quanta may be used by the AI NPC to purchase extra turns, more powerful weapons, the ability to spy on the opponent's game board, etc. These are the same items the opposing player may purchase with Quanta they have won in the hybrid game. A more detailed example of a Battleship type game is given below.

Battleship (also known as battleships or sea battle) is a head-to-head guessing game. Battleship is known worldwide as a pencil and paper game, which predates World War I. This game has been published in various forms, including pad-and-pencil versions, board game versions and electronic or video game versions for multiple operating systems, entertainment platforms and computing platforms.

In various embodiments, a head-to-head game such as battleship may incorporate a parallel AI hybrid game architecture, for play, where the players opponent in the entertainment game is an AI NPC, as previously described.

In other embodiments, a head-to-head or multi-player game may exist which incorporates a parallel RWE architecture, as described herein, for two or more non-AI players, where none of the players are an AI NPC.

Figure 17:
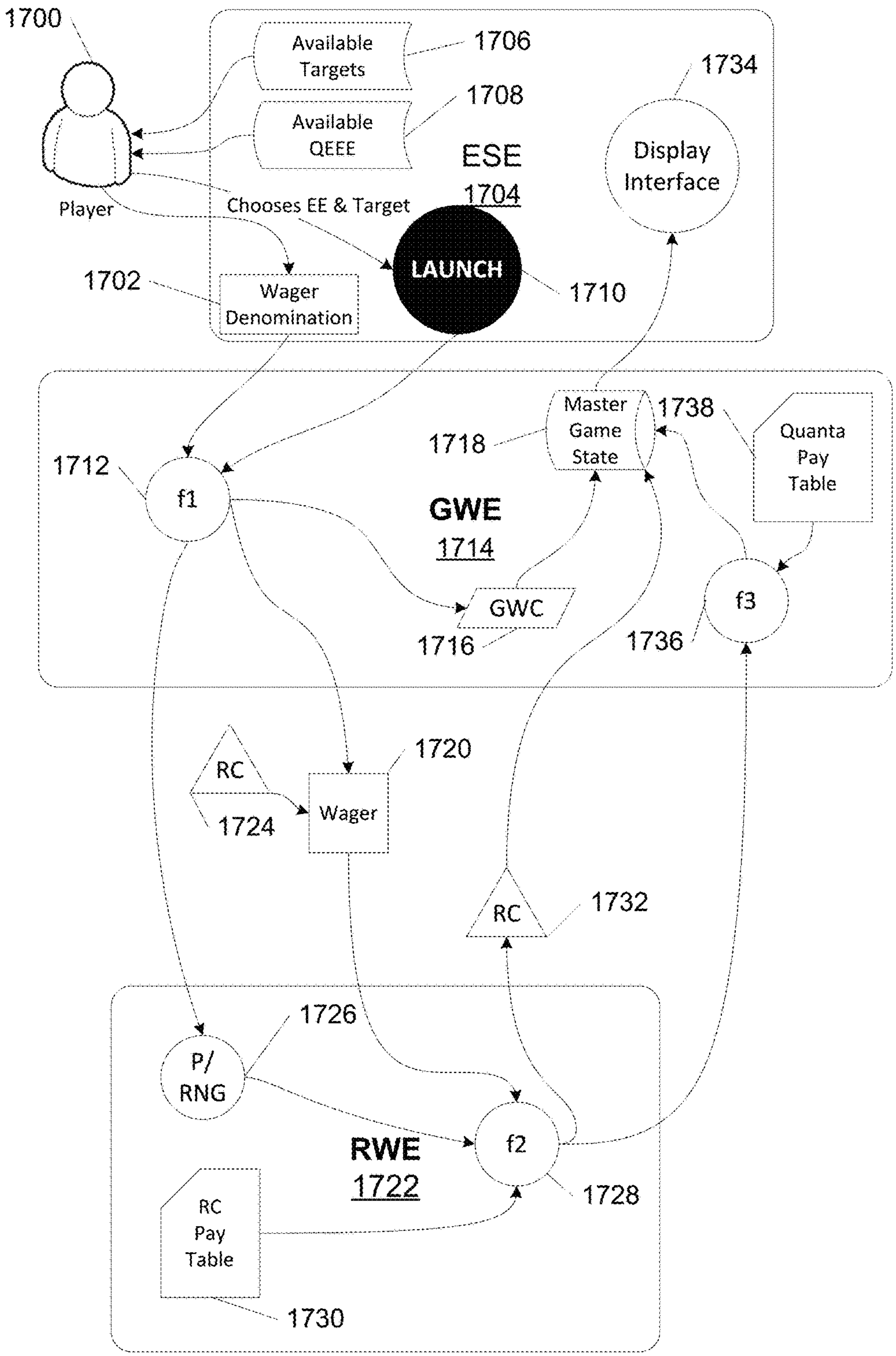
FIG. 17 is a flow chart, showing the process of play for a player of a parallel AI hybrid game in accordance with embodiments of the invention.

In various embodiments, a parallel AI hybrid game may exist based on the game battleship. The parallel AI hybrid game may allow for head-to-head play, between players (human, non-AI NPC) or may allow for play between a player and an AI NPC. FIG. 17 is a flow chart, showing the process of play for a player of a parallel AI hybrid game in accordance with embodiments of the invention. The flow chart shown may apply to each player, in a player vs. player game, or to the player in a player vs. AI NPC game.

As illustrated in FIG. 17, the player 1700 may select the wager denomination 1702 they wish to play in the hybrid game. Once play of the entertainment game commences, the player may receive information from the ESE, regarding available targets 1706 (un-played squares) on a game board, as well as available Quanta 1708 enabled enabling elements (QEEE) that the player may play against their opponent. The player may instruct the ESE by choosing the EE (or QEEE) they wish to play, and by selecting their target square(s). Once the player has selected their EE and target, they may submit their play to the GWE by invoking the launch function 1710. As an example, the launch function may be invoked by actuating a "Launch" or "Play" button, which is part of the user interface. In some embodiments, other actions may be used to invoke the play function, for example, pulling a slot machine style lever on a casino style gaming device, or clicking on a button on a PC based game.

In several embodiments, by invoking the launch function, the player commits to a gambling proposition, the parameters of which may be a function of f1 1712 in the GWE. Function f1 may include the following processes:

- Verify that the target position(s) is/are valid, prior to awarding GWC and triggering a wager 1720 in the RWE 1722;
- Determine if the played EE hits or misses any of the opponents ships and compute the points or GWC 1716 earned based factors that may include the number of hits or misses, which enemy vessel was hit, whether the enemy vessel was sunk, and/or other parameters;
- Generate GWC 1716, which would then be summed with the existing GWC and updated in the master game state 1718;
- Update the master game state 1718 with the updated board state, in the GWE 1714, once the play has been verified;
- Determine the amount of real credits (RC) 1724 to be wagered, based upon inputs which may include type of EE used (for example if an extra turn is played, using QEEE, a wager may be required for each turn played) and wager denomination selected by the player. For example a player opts to gamble $0.02 per torpedo, and the player launces two torpedoes in a turn, this may result in two $0.02 wagers, or a single wager of $0.04. This is shown as an example, other formulae could be used, depending on casino, regulatory or other input or requirements; and
- Trigger the pseudo random or random number generator (P/RNG)/gambling 1726, in the RWE 1722.

In various embodiments, the RWE 1722 may contain a function f2 1728. f2 1728 may take as inputs, the amount of RC bet 1724, or the wager, the result of the P/RNG 1726, and a pay table 1730. Based on the RNG result and pay table look-up, and amount of RC wagered, f2 computes the amount of RC 1732, if any, won by the player. RC won is fed back to the master game state 1718 in the GWE 1714, and displayed to the player, via the ESE 1704 display interface 1734.

In some embodiments, aspects of the game, including RC or Quanta won or lost, RC meter values, Quanta available, Quanta selector user interface etc. may be presented as an overlay on the ESE's display interface.

In many embodiments, function f3 1736, which resides in the GWE 1714, includes an algorithm to determine how much if any Quanta is to be awarded based on the outcome of the gambling proposition. The output of f2 1728, and it's inputs, including wager 1720, P/RNG 1726, RC pay table 1730, and the Quanta pay table 1738, may also serve as inputs to f3. How much, if any, Quanta is generated by f3 may vary significantly, based upon factors such as desired player experience, game personality desired, including how much influence the outcome of the gambling game may have on the entertainment or skill based game. In some embodiments the amount of Quanta generated may be inversely proportional to the gambling result, potentially allowing a player which is doing poorly in the gambling game to gain advantage in the entertainment or skill game. The Quanta generated by f3, will be summed with existing Quanta and stored with the master game state 1718, pending it's future use, by the player. The amount of Quanta available, along with a display of items that may be purchased with the Quanta is displayed to the player, via the display interface 1734 in the ESE.

In various embodiments the master game state will pass information including, but not limited to, the state of the game board or field of play, current score (GWC) opponents current score, Quanta available, QEEE available, wager denomination, and current RC balance, which may be displayed to the player, via the display interface.

In some embodiments, of a head-to-head hybrid game, as shown in FIG. 17, one the players may be an AI NPC, which exists outside of the hybrid game system. This type of AI NPC is often referred to as a bot, and would play in place of the player noted in FIG. 17. In the case that an AI NPC plays in place of one of the players, virtual real currency (VC) may be played in place of RC. In all other aspects of the game, the AI NPC would have all of the same advantages and disadvantages that a human player would have, including the ability to earn GWC, Quanta, etc., as well as the ability to use QEEE in play, against the human opponent.

Figure 18:
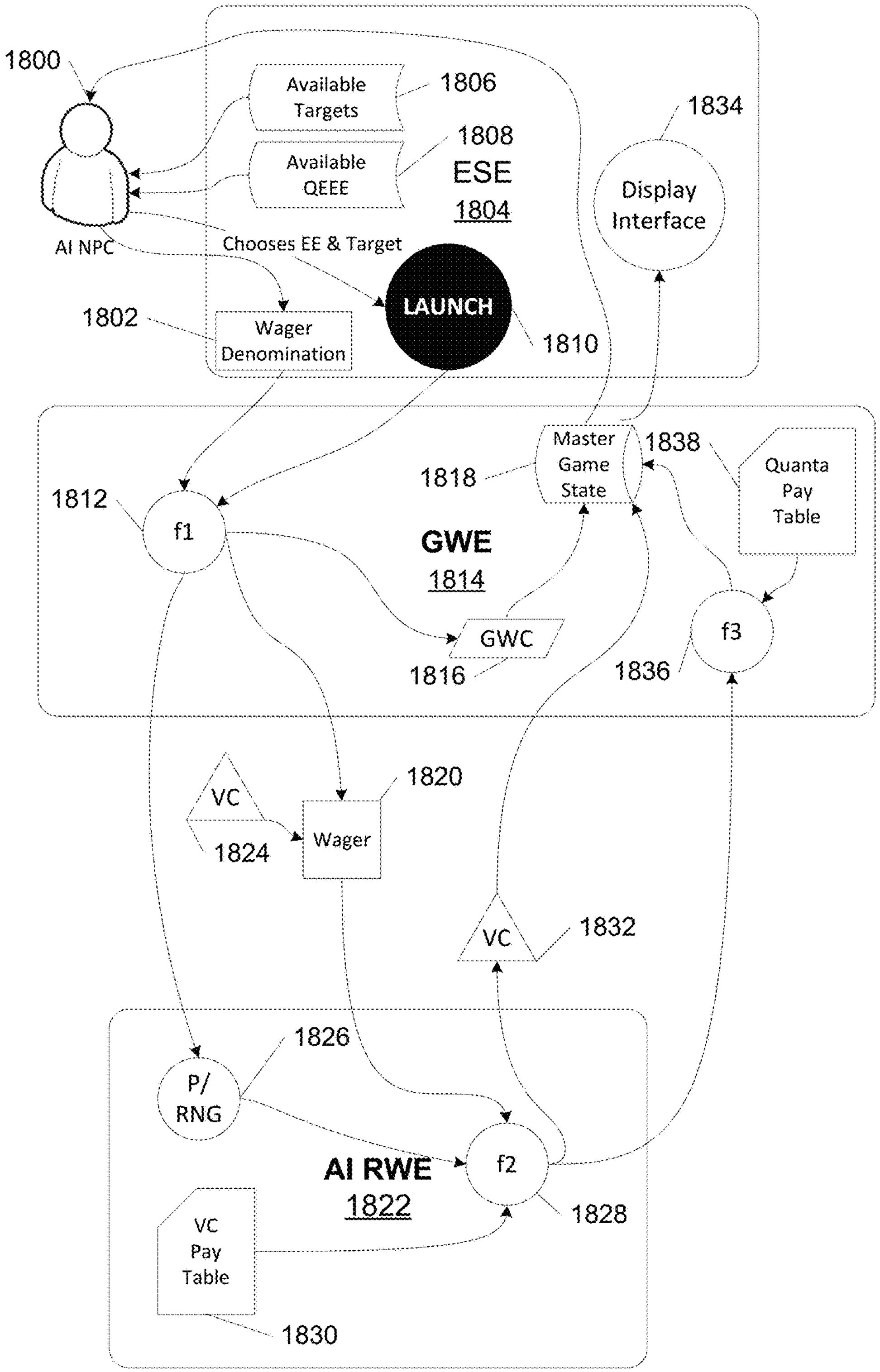
FIG. 18 is a flow chart showing the process of play for an AI NPC in accordance with embodiments of the invention.

In various embodiments, a parallel AI hybrid game may exist based on the game battleship. The parallel AI hybrid game may allow for head-to-head play, between players (human, non-AI NPC) or may allow for play between a player and an AI NPC. FIG. 18 is a flow chart showing the process of play for an AI NPC in accordance with embodiments of the invention. The flow chart shown may apply to an AI NPC, in a player vs. AI NPC game.

As illustrated in FIG. 18, the AI NPC 1800, which is present in the ESE 1804, may select the wager denomination 1802 it will play in the hybrid game. Once play of the entertainment game commences, the AI NPC may receive information from other elements in the ESE, regarding available targets 1806 (un-played squares) on a game board, as well as available Quanta enabled enabling elements (QEEE) 1808 that the AI NPC may play against its player opponent. The AI NPC may instruct the ESE by choosing the EE (or QEEE) it will play, and by selecting it's target square(s). Once the AI NPC has selected it's EE and target, it may submit it's play to the GWE 1814 by invoking the launch function 1810.

In several embodiments, by invoking the launch function, the AI NPC commits to a gambling proposition, the parameters of which may be a function of f1 1812 in the GWE. Function f1 may include the following processes:

- Verify that the target position(s) is/are valid, prior to awarding GWC 1816 and triggering a wager 1820 in the AI RWE 1822;
- Determine if the played EE hits or misses any of the opponents ships and compute the points or GWC earned based factors that may include the number of hits or misses, which enemy vessel was hit, whether the enemy vessel was sunk, and/or other parameters;
- Generate GWC, which would then be summed with the existing GWC and updated in the master game state 1818;
- Update the master game state, with the updated board state, in the GWE, once the play has been verified;
- Determine the amount of virtual credits (VC) 1824 to be wagered, based upon inputs which may include type of EE used (for example if an extra turn is played, using QEEE, a wager may be required for each turn played) and wager denomination selected by the AI NPC. For example the AI NPC opts to gamble a virtual $0.02 per torpedo, and the AI NPC launces two torpedoes in a turn, this may result in two virtual $0.02 wagers, or a single wager of virtual $0.04. This is shown as an example, other formulae could be used, depending on casino, regulatory or other input or requirements; and
- Trigger the pseudo random or random number generator (P/RNG)/gambling 1826, in the AI RWE 1822.

In various embodiments, the AI RWE may contain a function f2 1828. f2 may take as inputs, the amount of VC bet 1824, or the wager 1820, the result of the P/RNG, and a VC pay table 1830. Based on the P/RNG result and VC pay table look-up, and amount of VC wagered, f2 computes the amount of VC 1832, if any, won by the AI NPC. VC won is fed back to the master game state in the GWE, and reported to the AI NPC, present in the ESE.

In many embodiments, function f3 1836, which resides in the GWE, determines how much, if any, Quanta is to be awarded based on the outcome of the gambling proposition. The output of f2, and by definition it's inputs, including wager, P/RNG, VC pay table, and the Quanta pay table 1838 may also serve as inputs to f3. The determination of how much if any Quanta is generated by f3 may very significantly, based upon factors such as desired AI NPC player experience, AI NPC sgame personality desired, including how much influence the outcome of the gambling game may have on the entertainment or skill based game. In some embodiments the amount of Quanta generated may be inversely proportional to the gambling result, potentially allowing a player or AI NPC which is doing poorly in the gambling game to gain advantage in the entertainment or skill game. The Quanta generated by f3, will be summed with existing Quanta and stored with the master game state, pending it's future use, by the AI NPC.

In various embodiments the master game state 1818, will pass information including, but not limited to, the state of the game board or field of play, current score (GWC) opponents current score, Quanta available, QEEE available, wager denomination, entertainment game resources available to play, and current VC balance, some or all of which may be displayed to the AI NPC's opponent, via the display interface 1834 in the ESE.

In some embodiments of a parallel AI hybrid game, with an AI NPC, the AI NPC may exist in the GWE 1814.

Figure 19:
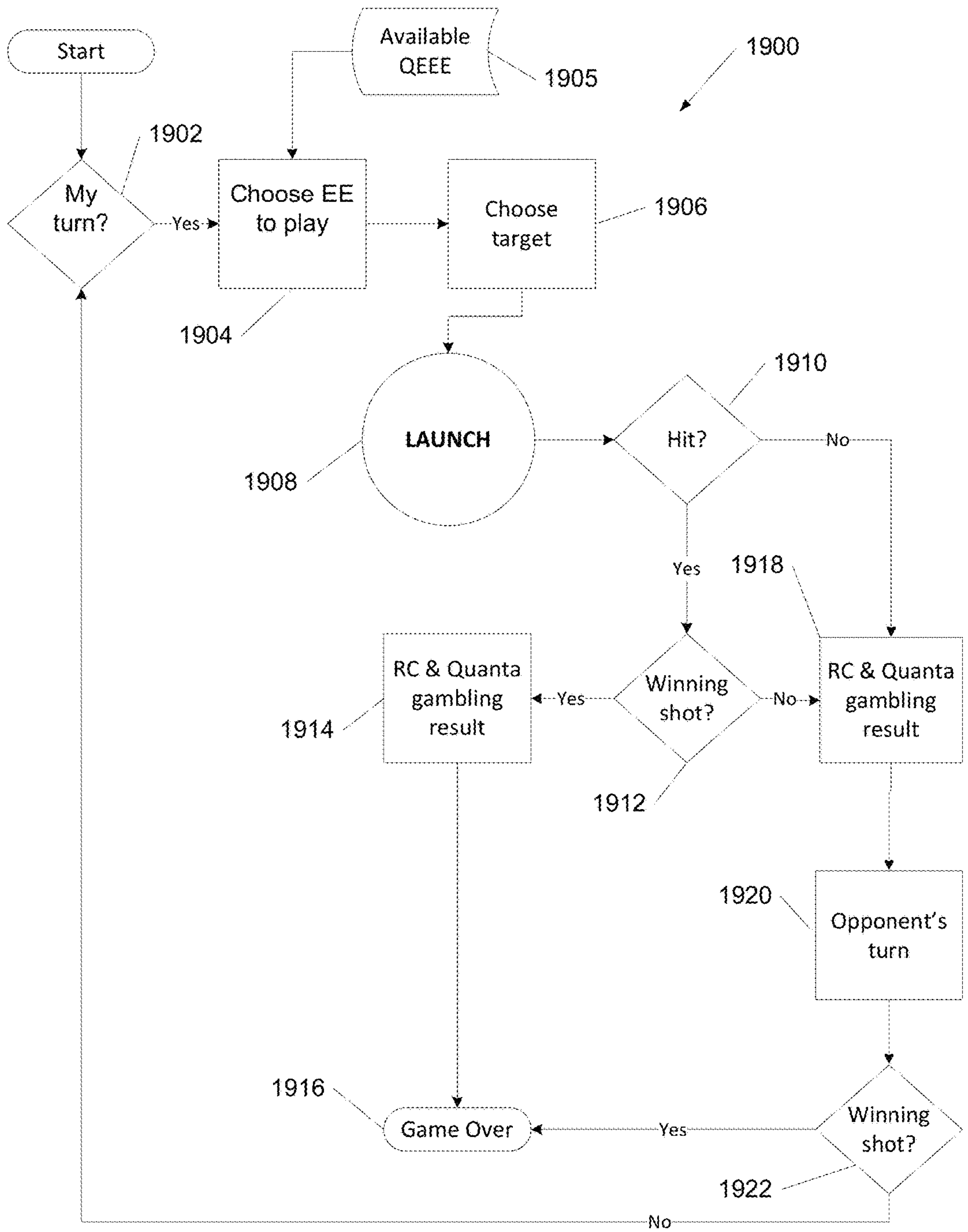
FIG. 19 is a flow chart, showing a process 1900 of a player turn in a parallel AI hybrid game based on the game of battleship in accordance with embodiments of the invention.

FIG. 19 is a flow chart, showing a process 1900 of a player turn in a parallel AI hybrid game based on the game of battleship in accordance with embodiments of the invention. In various embodiments, the process shown in FIG. 19 may be applicable to a player vs. player game, or a player vs. AI NPC game. Upon commencement 1902 of the player's turn in the game, EE is chosen (1904), EE may be a standard torpedo, or may be a QEEE item 1905, if available to the player. QEEE may include power-up type items, for example, one or more extra torpedoes or shots (in a single turn), a 2×2 square cluster bomb, the ability to spy on or peek at the opponents board, the ability to move a ship on the players board, etc. Once the EE is selected, and the target on the opponent's board is chosen (1906), the player may launch (1908) against their opponent.

In various embodiments, if a hit is recorded (1910), the game logic will determine (1912) if the hit was the game ending winning shot. If the hit was the game ending shot (the last of the opponent's ships was sunk), the gambling result for the wager will be displayed (1914), along with any Quanta won, and the game will be over (1916). If the hit was not the game ending shot, the gambling result for the RC wager will be displayed (1918) and added to the player's RC credits (in the case of a loss, the amount added may be 0 RC), along with any Quanta won, and play will switch to the opponents turn (1920). Upon completion of the opponents turn, if the opponent fired a winning shot (1922), the game is over (1916), if the winning shot was not fired, it is the players turn (1902). If no hit is recorded, then the gambling result for the wager will be displayed 1918 and added to the player's RC credits, along with any Quanta won, and play will switch to the opponents turn 1920. Upon completion of the opponents turn, if the opponent fired a winning shot 1922, the game is over 1916, if the winning shot was not fired, it is the players turn 1902.

Figure 20:
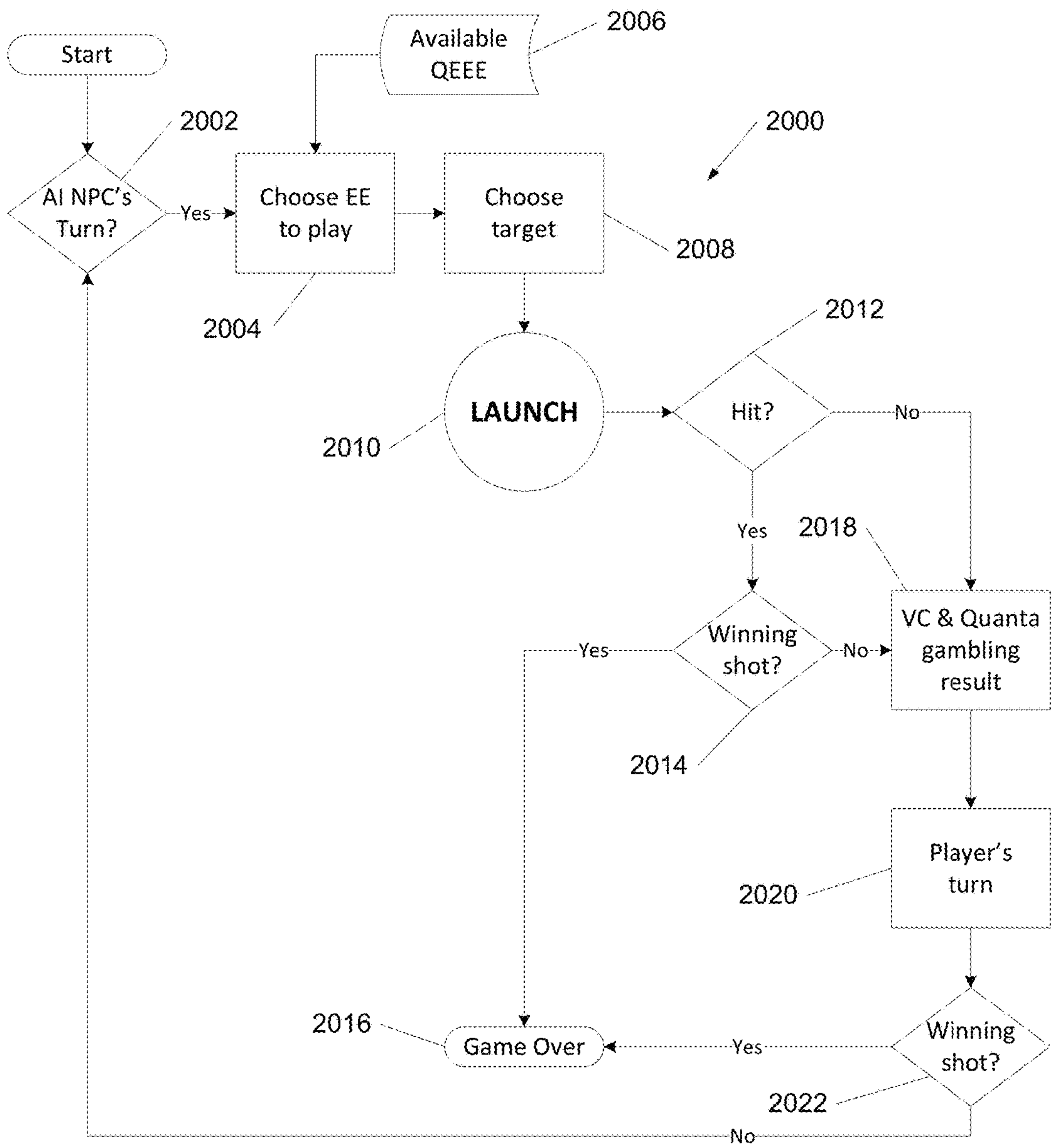
FIG. 20 is a flow chart, showing a process of an AI NPC turn in a parallel AI hybrid game, based on the game of battleship in accordance with embodiments of the invention.

FIG. 20 is a flow chart, showing a process 2000 of an AI NPC turn in a parallel AI hybrid game, based on the game of battleship in accordance with embodiments of the invention. In various embodiments, the process shown in FIG. 20 is applicable to a player vs. AI game. Upon commencement (2002) of the AI NPC's turn in the game, EE is chosen (2004), EE may be a standard torpedo, or may be a QEEE item 2006, if available to the AI NPC. QEEE may include power-up type items, for example, one or more extra torpedoes or shots (in a single turn), a 2×2 square cluster bomb, the ability to spy on or peek at the opponents board, the ability to move a ship on the AI NPC's board, etc. Once the EE is selected (2004), and the target on the opponent's board is chosen (2008) the AI NPC may launch (2010) against their opponent.

In various embodiments, if a hit is recorded (2012), the game logic will determine if the hit was the game ending winning shot (2014). If the hit was the game ending shot (the last of the opponent's ships was sunk), the game will be over (2016). If the hit was not the game ending shot, the gambling result for the VC wager will be credited to the AI NPC (2018) along with any Quanta won, and play will switch to the opponent's (player's) turn (2020). Upon completion of the opponent's turn, if the opponent fired a winning shot (2022), the game is over (2016), if the winning shot was not fired, it is the AI NPC's turn (2002). If no hit is recorded, then the gambling result for the wager will be credited (2018) to the AI NPC, along with any Quanta won, and play will switch to the opponents turn (2020). Upon completion of the opponent's turn, if the opponent fired a winning shot (2022), the game is over (2016), if the winning shot was not fired, it is the AI NPC's turn (2002).

Figure 21:
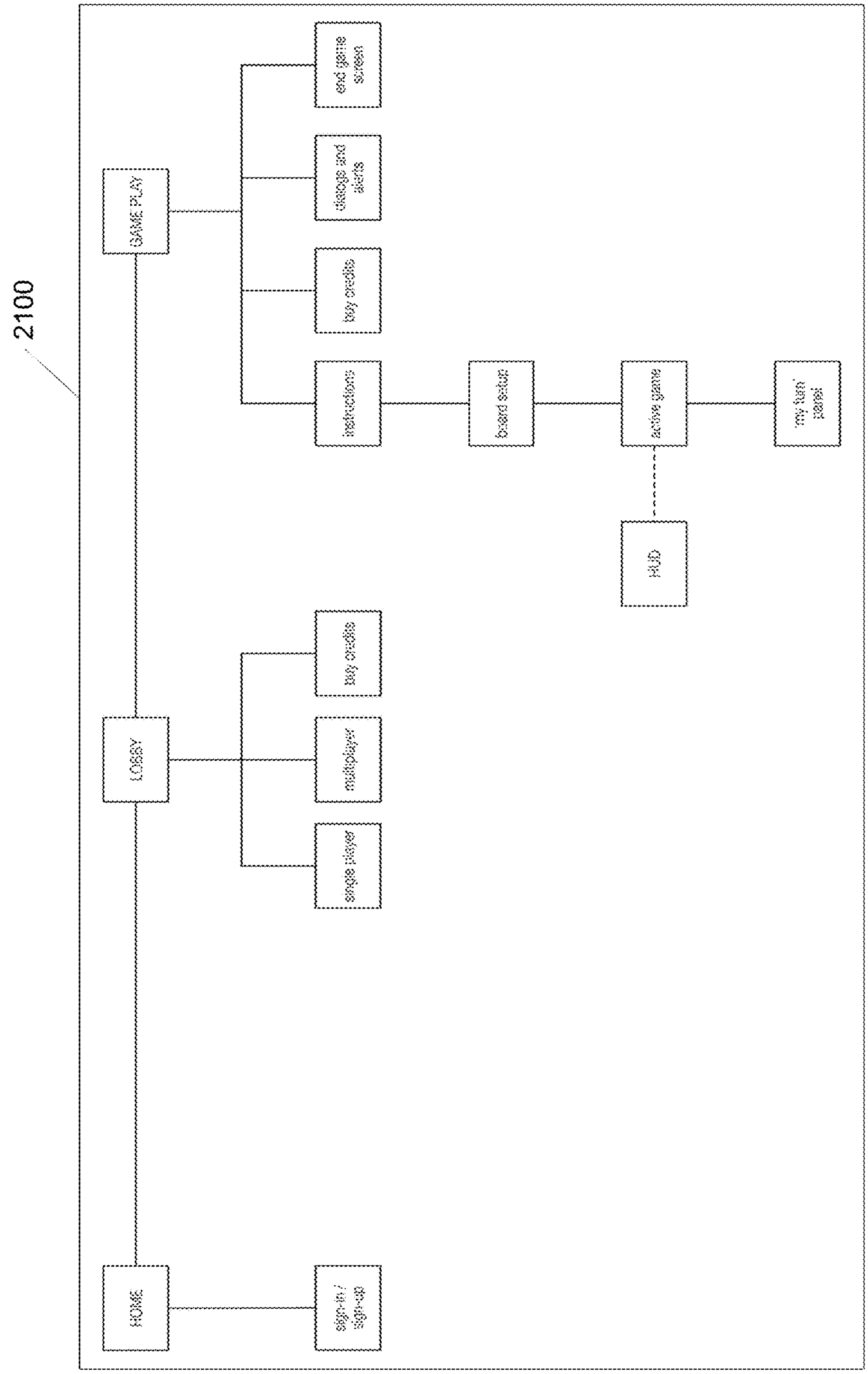
FIG. 21 is an application map for a parallel AI hybrid game based upon the game of battleship in accordance with embodiments of the invention.

In various embodiments, a parallel AI hybrid game (hybrid game) may exist, based upon the game of battleship. FIG. 21 is an application map 2100 for such a hybrid game in accordance with embodiments of the invention.

The application may feature a home screen, from which the player may sign-in or sign up. In various embodiments, once a player has successfully signed into the game, they will enter the lobby. In the lobby, the player may be able to select from options which may include single player play (player vs. AI), multiplayer play (player 1 vs. player 2), or to purchase real credits (RC). In various embodiments, the player may enter game play from the lobby. Within the game play application module, the player may have access to instructions regarding board setup. Once the player has completed board setup, they may enter into the active game, which includes a heads-up display (HUD), and a my turn panel, where the player carries out their move in the game. In some embodiments, within the game play application module, the player may also be able to buy RC (credits), receive game dialog and/or alerts, or access an end game screen.

Figure 22:
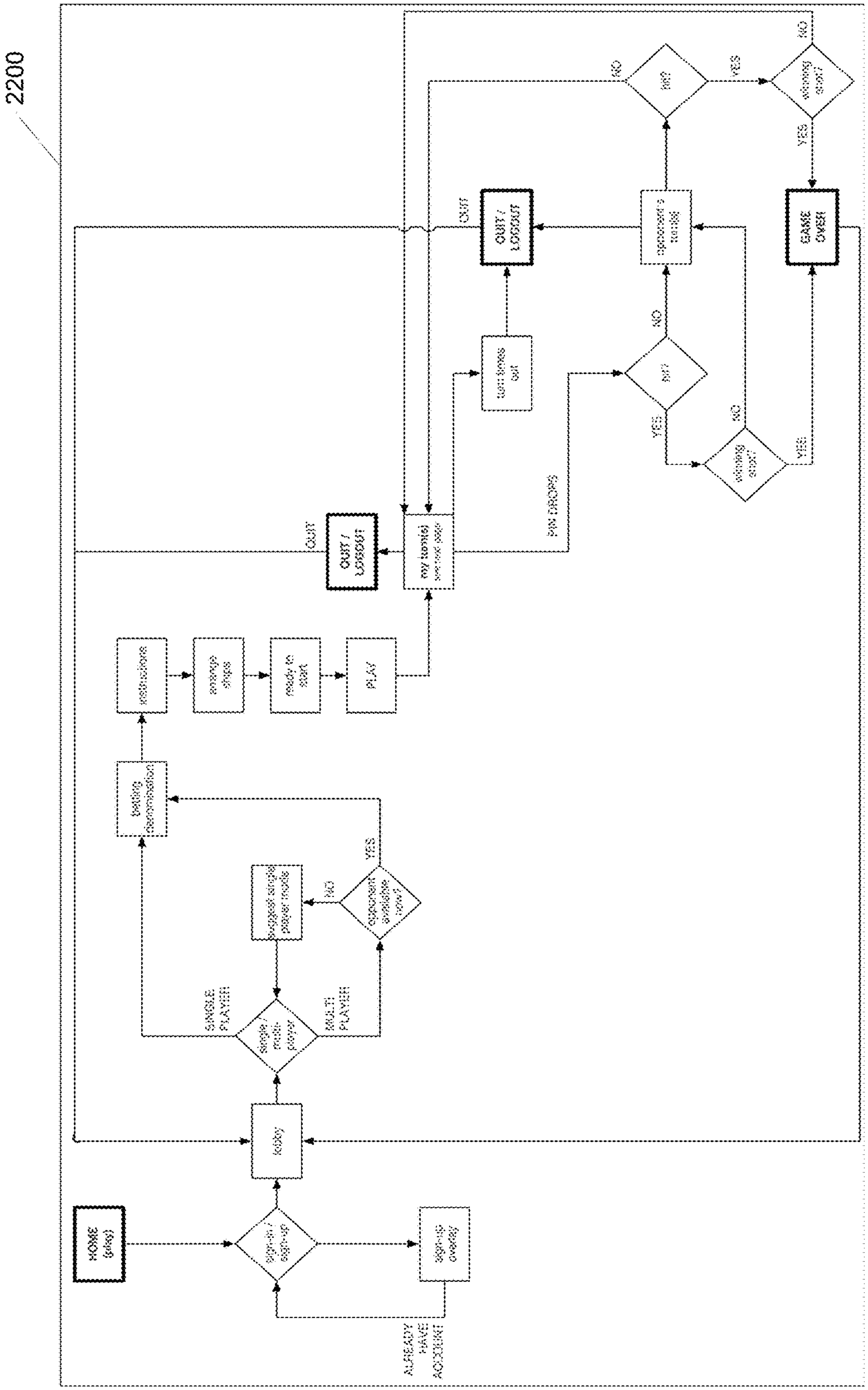
FIG. 22 is a state diagram for a parallel AI hybrid game based upon the game of battleship in accordance with embodiments of the invention.

In various embodiments, a hybrid game based upon the game of battleship may operate as illustrated by the state diagram 2200 in FIG. 22. Upon entry into the game, a home screen, may require the player to sign-in to play the hybrid game. If a player does not have an existing account, they may sign-up to establish an account, prior to signing-in. Once a player has successfully signed in to the hybrid game system, they will enter the player lobby.

In numerous embodiments, from within the lobby, the player may have the option of selecting a single player or multi-player game. In the case that the player selects multi-player play, one aspect of the lobby may be to verify the availability of an opponent, and match the player with an opponent prior to proceeding. In the case that no opponent is available, the game may suggest that a player wait for an opponent or play a single player game, which would be played against an AI NPC.

In various embodiments, once a player has selected single player or multi-player (and been matched with an opponent,) the player may be prompted to select a betting denomination. In a hybrid game based upon the game of battleship, a bet may be triggered when an enabling element (EE) is played in the game. In the game battleship, EE may be represented by a torpedo or other weapon, played against the player's opponent. The betting denomination may represent the amount of RC wagered each time EE is expended by the player. The betting denominations may be set by the hybrid game operator, casino, regulatory agency, or other factors and/or combination of the preceding. An example of betting denomination choices may be $0.05, $0.25, $1.00, $5.00.

In various embodiments, once a player has selected their betting denomination, they may receive instructions, regarding how to place and arrange ships, on their game grid. When a player has confirmed that they have completed the placement of their ships, and in the case of multi-player, their opponent has done the same, they are ready to start game play.

In various embodiments, the player may have several options, when it is their turn as described herein. Upon commencement of a player's turn, the player may choose to quit the game, at which point they will be returned to the game lobby. The player's turn may also be subject to a time-out clock, which upon expiration, may cause the player to automatically quit the game and be returned to the game lobby. When a player fires a torpedo, or other EE against their opponents, the game logic will determine if the player's EE has hit one of the players opponents ships on the game grid. In the case that an opponent's ship is hit, the game logic will determine if the hit is the winning shot (implying that all of the player's opponents ships have been sunk). If the hit was the winning shot, the game is over, and the player is returned to the game lobby. If the hit is not the winning shot or the players shot is a miss, the player's turn is over, and play switches to the player's opponent (AI NPC or another player).

In various embodiments, if playing a multi-player game, when it's the opponent's turn, the opponent has the same options the player has during their turn, which includes the option to quit the game, in which case the player will be returned to the game lobby. In the case of a multi-player game, the potential also exists that the opponent could time out of the game, if they do not play within a designated amount of time, in this case, the game may quit, and the player may be returned to the lobby. In the case that the opponents shot is a hit, and is the winning shot, the game is over, and the player will be returned to the game lobby. In the case that the hit is not the winning shot or that the players shot is a miss, then the opponents turn is over, and play switches to the player's turn.

Figure 23A:
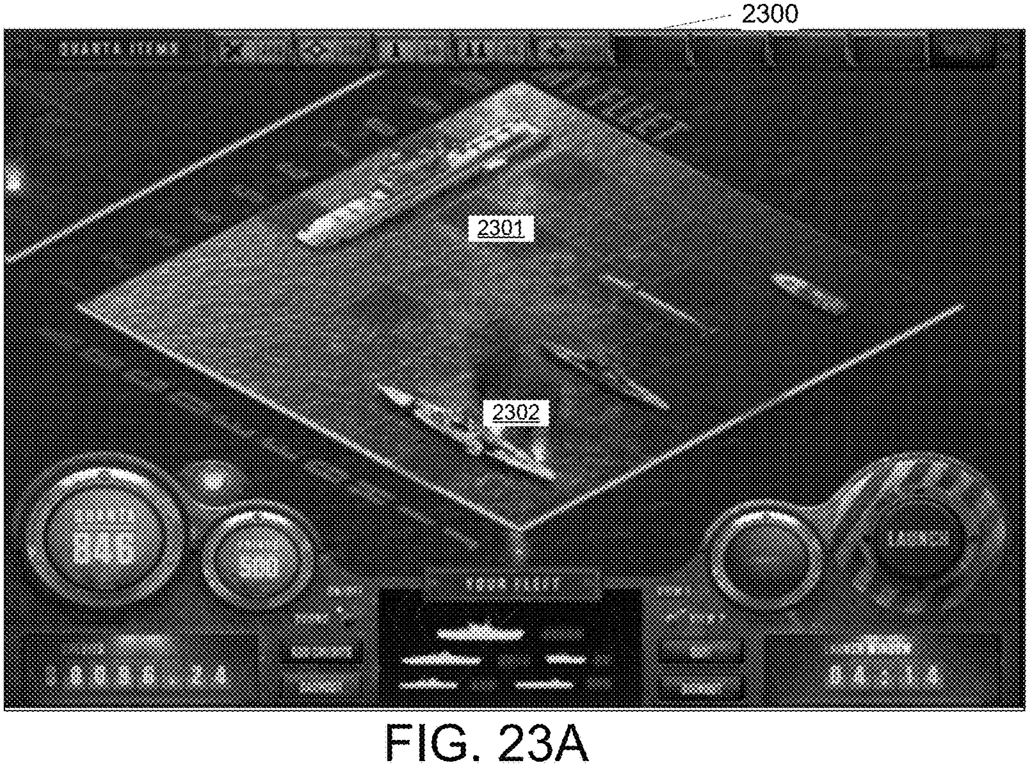
FIGS. 23A, 23B and 23C illustrate display screens of a player interface for a parallel AI hybrid game, based upon the game of battleship during a turn of play of an AI NPC in accordance with embodiments of the invention.
Figure 23B:
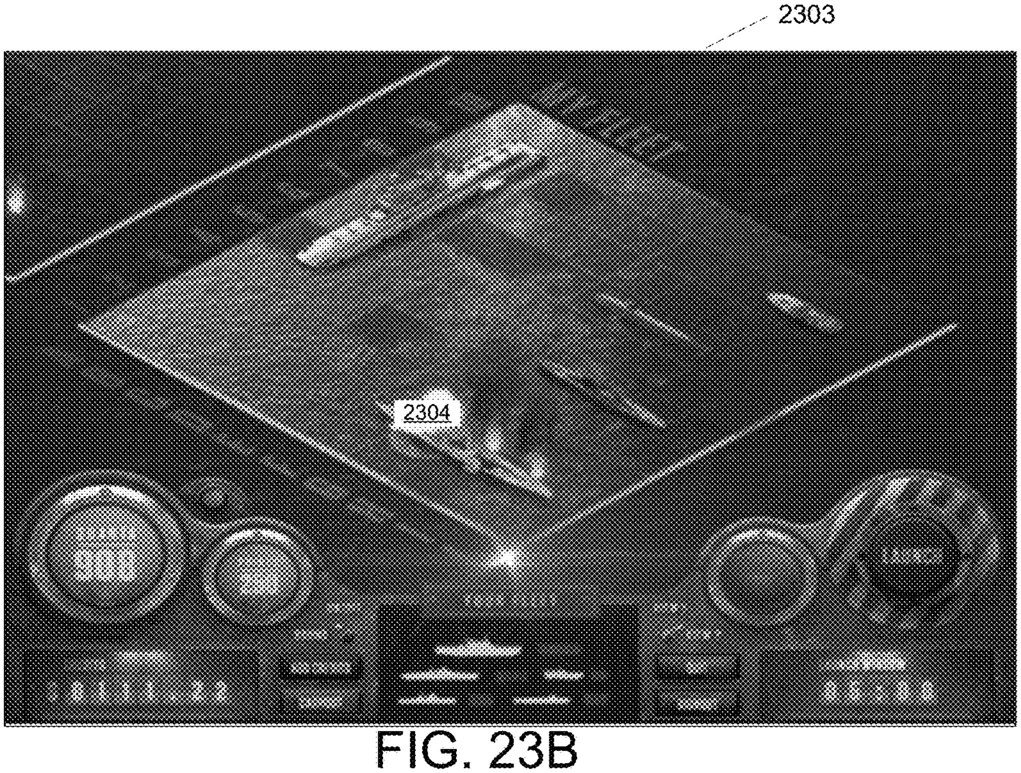
Figure 23C:

FIGS. 23A, 23B and 23C illustrate display screens of a player interface for a parallel AI hybrid game, based upon the game of battleship during a turn of play of an AI NPC in accordance with embodiments of the invention. Referring to FIG. 23A, a display screen 2300 of the parallel AI hybrid game is illustrated. In the display, greyed out squares (such as greyed out squares 2301) on the game grid represent previous shots made by the AI NPC, which have missed the player's ships. Two columns of fire 2302 on the player's battleship represent two shots from the AI NPC that have hit the player's battleship.

FIG. 23B illustrates another display screen 2303 showing the next shot from the AI NPC against the player's fleet of ships, which is a third hit 2304 to the player's battleship.

FIG. 23C illustrates another display screen 2305, showing the game board, after the AI NPC has sunk (2306) the player's battleship.

Figure 24A:
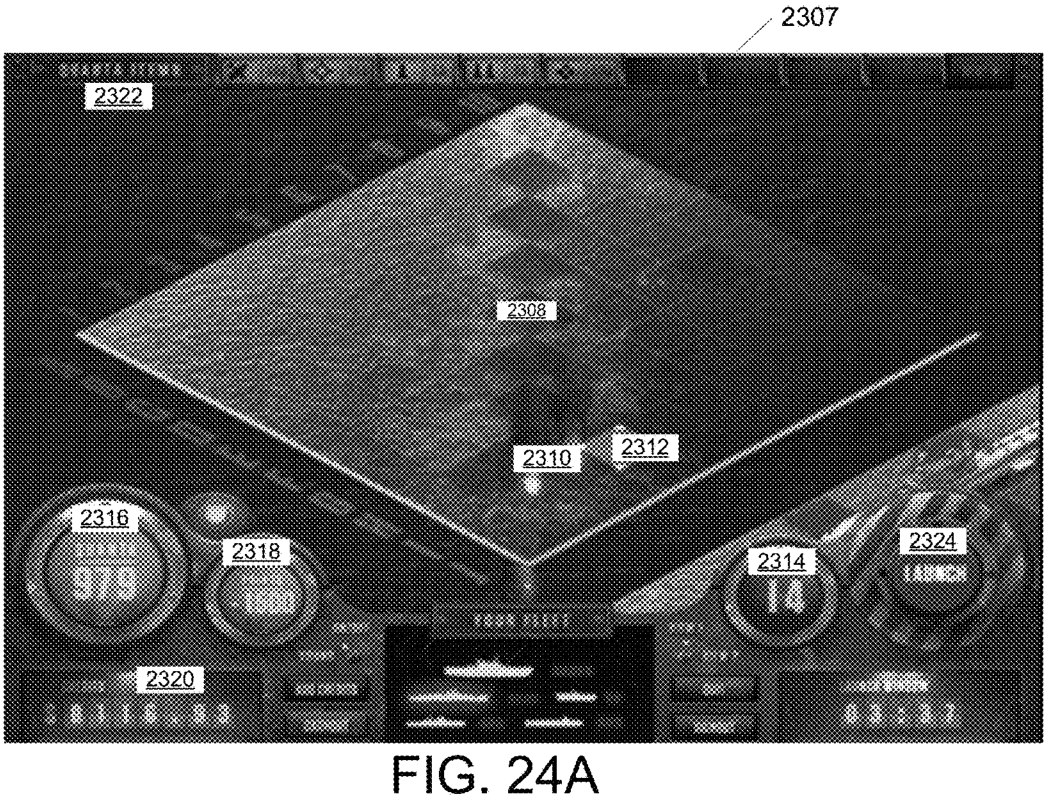
FIGS. 24A and 24B illustrate display screens of a player interface for a parallel AI hybrid game based upon the game of battleship during a player's turn in accordance with embodiments of the invention.
Figure 24B:

FIGS. 24A and 24B illustrate display screens of a player interface for a parallel AI hybrid game based upon the game of battleship during a player's turn in accordance with embodiments of the invention. Referring to FIG. 24A, a display screen 2307 of a player's view of an opponent's board is illustrated. Greyed out squares (such as greyed out square 2308) on the board represent previous misses that the player has made against their opponent. Two columns of fire 2310 represent hits against the player's opponent. A white overlay 2312 on square 14 represent a target square of the player's next torpedo, a location 2314 is also shown on a heads-up display (HUD), in the lower right corner of the display. In addition to the game board, the player's HUD includes a display 2316 of the player's available Quanta, the player's GWC (points) score 2318 and the player's RC balance 2320 in the lower left corner of the screen. Additionally, the HUD includes a catalog 2322 of Quanta items (QEEE) along the top edge of the display. By actuating a launch button 2324 on the HUD, the player initiates their play against their opponent, which triggers a wager event in a RWE, via a GWE as described herein.

Referring to FIG. 24B, another display screen 2312 of a player's view of an opponent's board is illustrated. Display screen 2312 shows the result of a player's wager triggered by play of the parallel AI hybrid game, including an amount of RC 2314 and Quanta won 2316, if any.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that a hybrid gaming system may be practiced otherwise than as specifically described. Thus, the foregoing description of the hybrid gaming system should be considered in all respects as illustrative and not restrictive, the scope of the claims to be determined as supported by this disclosure and the claims' equivalents, rather than the foregoing description.

What is claimed is:

1. A parallel AI hybrid gaming system, comprising:

a processing device constructed to:

execute an entertainment game of skill for a player, wherein the player is a human player;

communicate, to a game world server, a signal including a trigger of a wager of game world credits triggered by a player's action during the player's skillful play of the entertainment game;

communicate, to the game world server, a signal including a trigger of a wager of virtual credits triggered by an Artificially Intelligent Non-Player Character's (AI NPC) action taken by an AI NPC opponent of the player during the player's skillful play of the entertainment game, wherein the AI NPC is not the human player;

receive, from the game world server, a signal including a result of a wager of game world credits triggered by the player's action during the player's skillful play of the entertainment game;

receive, from the game world server, a signal including a result of a wager of virtual credits triggered by the AI NPC's action taken by the AI NPC opponent of the player during the player's skillful play of the entertainment game;

display the result of the wager of game world credits triggered by the player's action during the player's skillful play of the entertainment game; and display the result of the wager of virtual credits triggered by the AI NPC's action taken by the AI NPC opponent of the player during the player's skillful play of the entertainment game;

a player real world server constructed to:

receive, from the game world server, a signal including a request for a resolution of the wager of game world credits triggered by the player's action during the player's skillful play of the entertainment game;

determine the result of the wager of game world credits triggered by the player's action during the player's skillful play of the entertainment game; and communicate, to the game world server, the signal including the result of the wager of game world credits triggered by the player's action during the player's skillful play of the entertainment game;

an AI real world server constructed to:

receive, from the game world server, a signal including a request for a resolution of a wager of virtual credits triggered by the AI NPC's action taken by the AI NPC opponent of the player during the player's skillful play of the entertainment game;

determine the result of the wager of virtual credits triggered by the AI NPC's action taken by the AI NPC opponent of the player during the player's skillful play of the entertainment game; and communicate, to the game world server, the signal including the result of the wager of virtual credits triggered by the AI NPC's action taken by the AI NPC opponent of the player during the player's skillful play of the entertainment game; and the game world server, connected to the processing device and the AI real world server via a network and connected to the real world server via a communication link, constructed to:

continuously monitor the processing device for the signal including the trigger of the wager of game world credits triggered by the player's action during the player's skillful play of the entertainment game;

continuously monitor the processing device for the signal including the trigger of the wager of virtual credits triggered by the AI NPC's action taken by the AI NPC opponent of the player during the player's skillful play of the entertainment game;

receive, from the processing device, the signal including the trigger of the wager of game world credits triggered by the player's action during the player's skillful play of the entertainment game;

receive, from the processing device, the signal including the trigger of the wager of virtual credits triggered by the AI NPC's action taken by the AI NPC opponent of the player during the player's skillful play of the entertainment game;

distinguish between the signal including the trigger of the wager of game world credits triggered by the player's action during the player's skillful play of the entertainment game and the signal including the trigger of the wager of virtual credits triggered by the AI NPC's action taken by the AI NPC opponent of the player during the player's skillful play of the entertainment game;

determine whether to trigger the wager based on the signal including the trigger of the wager of game world credits triggered by the player's action during the player's skillful play of the entertainment game;

determine whether to trigger the wager based on the signal including the wager of virtual credits triggered by the AI NPC's action taken by the AI NPC opponent of the player during the player's skillful play of the entertainment game;

communicate, to the real world server, the signal including the request for the resolution of the wager of game world credits triggered by the player's action during the player's skillful play of the entertainment game;

communicate, to the AI real world server, the signal including the request for the resolution of the wager of virtual credits triggered by the AI NPC's action taken by the AI NPC opponent of the player during the player's skillful play of the entertainment game;

receive, from the real world server, the signal including the result of the wager of game world credits triggered by the player's action during the player's skillful play of the entertainment game;

receive, from the AI real world server, the signal including the result of the wager of virtual credits triggered by the AI NPC's action taken by the AI NPC opponent of the player during the player's skillful play of the entertainment game;

communicate, to the processing device, the signal including the result of the wager of game world credits triggered by the player's action during the player's skillful play of the entertainment game;

communicate, to the processing device, the signal including the result of the wager of virtual credits triggered by the AI NPC's action taken by the AI NPC opponent of the player during the player's skillful play of the entertainment game.

2. The parallel AI hybrid gaming system of claim 1 wherein the game world server is further constructed to determine an amount of Quanta to award to the player on a basis of the result of the wager of real world credits, wherein Quanta is an intermediate in-game user resource which may be used to purchase or enable additional in game resources.

3. The parallel AI hybrid gaming system of claim 1 wherein the game world server is further constructed to determine an amount of Quanta to award to the AI NPC on a basis of the result of the wager of virtual credits, wherein Quanta is an intermediate in-game user resource which may be used to purchase additional in game resources.

4. The parallel AI hybrid gaming system of claim 1 wherein the player's and the AI NPC's actions occur serially.

5. The parallel AI hybrid gaming system of claim 1 wherein the player's and the AI NPC's actions occur at the same time.

6. A parallel AI hybrid gaming system, comprising:

a player real world server constructed to:

receive, from a game world server, a signal including a request for a resolution of a wager of game world credits triggered by a player's action during a player's skillful play of an entertainment game;

determine a result of the wager of game world credits triggered by the player's action during the player's skillful play of the entertainment game; and communicate, to the game world server, the signal including the result of the wager of game world credits triggered by the player's action during the player's skillful play of the entertainment game;

an AI real world server constructed to:

receive, from the game world server, the signal including a request for a resolution of a wager of virtual credits triggered by an AI NPC's action taken by an AI NPC opponent of the player during the player's skillful play of the entertainment game;

determine a result of the wager of virtual credits triggered by the AI NPC's action taken by the AI NPC opponent of a player during the player's skillful play of the entertainment game; and communicate, to the game world server, a signal including the result of the wager of virtual credits triggered by the AI NPC's action taken by the AI NPC opponent of the player during the player's skillful play of the entertainment game; and the game world server, connected to a processing device and the AI real world server via a network and connected to the real world server via a communication link, constructed to:

continuously monitor the processing device for a signal including a trigger of the wager of game world credits triggered by the player's action during the player's skillful play of the entertainment game;

continuously monitor the processing device for a signal including a trigger of the wager of virtual credits triggered by the AI NPC's action taken by the AI NPC opponent of the player during the player's skillful play of the entertainment game;

receive, from the processing device, the signal including the trigger of the wager of game world credits triggered by the player's action during the player's skillful play of the entertainment game;

receive, from the processing device, the signal including the trigger of the wager of virtual credits triggered by the AI NPC's action taken by the AI NPC opponent of the player during the player's skillful play of the entertainment game;

distinguish between the signal including the trigger of the wager of game world credits triggered by the player's action during the player's skillful play of the entertainment game and the signal including the trigger of the wager of virtual credits triggered by the AI NPC action taken by the AI NPC opponent of the player during the player's skillful play of the entertainment game;

determine whether to trigger the wager based on the signal including the trigger of the wager of game world credits triggered by the player's action during the player's skillful play of the entertainment game;

determine whether to trigger the wager based on the signal including the wager of virtual credits triggered by the AI NPC's action taken by the AI NPC opponent of the player during the player's skillful play of the entertainment game;

communicate, to the real world server, a signal including a request for a resolution of the wager of game world credits triggered by the player's action during the player's skillful play of the entertainment game;

communicate, to the AI real world server, a signal including a request for a resolution of the wager of virtual credits triggered by the AI NPC's action taken by the AI NPC opponent of the player during the player's skillful play of the entertainment game;

receive, from the real world server, the signal including the result of the wager of game world credits triggered by the player's action during the player's skillful play of the entertainment game;

receive, from the AI real world server, the signal including the result of the wager of virtual credits triggered by the AI NPC's action taken by the AI NPC opponent of the player during the player's skillful play of the entertainment game;

communicate, to the processing device, the signal including the result of the wager of game world credits triggered by the player's action during the player's skillful play of the entertainment game;

communicate, to the processing device, the signal including the result of the wager of virtual credits triggered by the AI NPC's action taken by the AI NPC opponent of the player during the player's skillful play of the entertainment game.

7. The parallel AI hybrid gaming system of claim 6 wherein the game world server is further constructed to determine an amount of Quanta to award to the player on a basis of the result of the wager of real world credits, wherein Quanta is an intermediate in-game user resource which may be used to purchase or enable additional in game resources.

8. The parallel AI hybrid gaming system of claim 6 wherein the game world server is further constructed to determine an amount of Quanta to award to the AI NPC on a basis of the result of the wager of virtual credits, wherein Quanta is an intermediate in-game user resource which may be used to purchase additional in game resources.

9. The parallel AI hybrid gaming system of claim 6 wherein the player's and the AI NPC's actions occur serially.

10. The parallel AI hybrid gaming system of claim 6 wherein the player's and the AI NPC's actions occur at the same time.

11. A parallel AI hybrid gaming system, comprising:

a processing device constructed to:

execute an entertainment game of skill for a player, wherein the player is a human player;

communicate, to a game world server, a signal including a trigger of a wager of game world credits triggered by a player's action during the player's skillful play of the entertainment game;

communicate, to the game world server, a signal including a trigger of a wager of virtual credits triggered by an Artificially Intelligent Non-Player Character's (AI NPC) action taken by an AI NPC opponent of the player during the player's skillful play of the entertainment game, wherein the AI NPC is not the human player;

receive, from the game world server, a signal including a result of a wager of game world credits triggered by the player's action during the player's skillful play of the entertainment game;

receive, from the game world server, a signal including a result of a wager of virtual credits triggered by the AI NPC's action taken by the AI NPC opponent of the player during the player's skillful play of the entertainment game;

display the result of the wager of game world credits triggered by the player's action during the player's skillful play of the entertainment game; and display the result of the wager of virtual credits triggered by the AI NPC's action taken by the AI NPC opponent of the player during the player's skillful play of the entertainment game; and the game world server, connected to the processing device and an AI real world server via a network and connected to a real world server via a communication link, constructed to:

continuously monitor the processing device for the signal including the trigger of the wager of game world credits triggered by the player's action during the player's skillful play of the entertainment game;

continuously monitor the processing device for the signal including the trigger of the wager of virtual credits triggered by the AI NPC's action taken by the AI NPC opponent of the player during the player's skillful play of the entertainment game;

receive, from the processing device, the signal including the trigger of the wager of game world credits triggered by the player's action during the player's skillful play of the entertainment game;

receive, from the processing device, the signal including the trigger of the wager of virtual credits triggered by the AI NPC's action taken by the AI NPC opponent of the player during the player's skillful play of the entertainment game;

distinguish between the signal including the trigger of the wager of game world credits triggered by the player's action during the player's skillful play of the entertainment game and the signal including the trigger of the wager of virtual credits triggered by the AI NPC action taken by the AI NPC opponent of the player during the player's skillful play of the entertainment game;

determine whether to trigger the wager based on the signal including the trigger of the wager of game world credits triggered by the player's action during the player's skillful play of the entertainment game;

determine whether to trigger the wager based on the signal including the wager of virtual credits triggered by the AI NPC's action taken by the AI NPC opponent of the player during the player's skillful play of the entertainment game;

communicate, to the real world server, a signal including a request for a resolution of the wager of game world credits triggered by the player's action during the player's skillful play of the entertainment game;

communicate, to the AI real world server, a signal including a request for a resolution of the wager of virtual credits triggered by the AI NPC's action taken by the AI NPC opponent of the player during the player's skillful play of the entertainment game;

receive, from the real world server, a signal including a result of the wager of game world credits triggered by the player's action during the player's skillful play of the entertainment game;

receive, from the AI real world server, a signal including a result of the wager of virtual credits triggered by the AI NPC's action taken by the AI NPC opponent of the player during the player's skillful play of the entertainment game;

communicate, to the processing device, the signal including the result of the wager of game world credits triggered by the player's action during the player's skillful play of the entertainment game;

communicate, to the processing device, the signal including the result of the wager of virtual credits triggered by the AI NPC's action taken by the AI NPC opponent of the player during the player's skillful play of the entertainment game.

12. The parallel AI hybrid gaming system of claim 11 wherein the game world server is further constructed to determine an amount of Quanta to award to the player on a basis of the result of the wager of real world credits, wherein Quanta is an intermediate in-game user resource which may be used to purchase or enable additional in game resources.

13. The parallel AI hybrid gaming system of claim 11 wherein the game world server is further constructed to determine an amount of Quanta to award to the AI NPC on a basis of the result of the wager of virtual credits, wherein Quanta is an intermediate in-game user resource which may be used to purchase additional in game resources.

14. The parallel AI hybrid gaming system of claim 11 wherein the player's and the AI NPC's actions occur serially.

15. The parallel AI hybrid gaming system of claim 11 wherein the player's and the AI NPC's actions occur at the same time.

* * * * *